(12) United States Patent
Nuspl et al.

(10) Patent No.: US 9,577,244 B2
(45) Date of Patent: Feb. 21, 2017

(54) SUBSTITUTED LITHIUM-MANGANESE METAL PHOSPHATE

(75) Inventors: Gerhard Nuspl, München (DE); Nicolas Tran, Nandlstadt (DE); Jasmin Dollinger, Freising (DE); Christian Vogler, Moosburg (DE)

(73) Assignee: JOHNSON MATTHEY PLC, London (GB)

( * ) Notice: Subject to any disclaimer, the term of this patent is extended or adjusted under 35 U.S.C. 154(b) by 791 days.

(21) Appl. No.: 13/575,665

(22) PCT Filed: Jan. 28, 2011

(86) PCT No.: PCT/EP2011/051199
§ 371 (c)(1),
(2), (4) Date: Nov. 28, 2012

(87) PCT Pub. No.: WO2011/092281
PCT Pub. Date: Aug. 4, 2011

(65) Prior Publication Data
US 2014/0356720 A1    Dec. 4, 2014

(30) Foreign Application Priority Data

Jan. 28, 2010  (DE) .................. 10 2010 006 077

(51) Int. Cl.
| H01M 4/00 | (2006.01) |
| H01M 4/13 | (2010.01) |
| H01M 4/58 | (2010.01) |
| H01M 4/50 | (2010.01) |
| H01M 4/82 | (2006.01) |
| H01M 6/00 | (2006.01) |

(Continued)

(52) U.S. Cl.
CPC ............. *H01M 4/136* (2013.01); *C01B 25/45* (2013.01); *H01M 4/366* (2013.01); *H01M 4/505* (2013.01); *H01M 4/525* (2013.01); *H01M 4/5825* (2013.01); *H01M 4/625* (2013.01); *Y02E 60/122* (2013.01)

(58) Field of Classification Search
CPC ...... H01M 4/1391; H01M 4/131; H01M 4/50; H01M 4/362; H01M 4/5825; H01M 2/0295
USPC ................... 429/221, 231.95, 224
See application file for complete search history.

(56) References Cited

U.S. PATENT DOCUMENTS

| 5,910,382 A | 6/1999 | Goodenough et al. |
| 6,514,640 B1 | 2/2003 | Armand et al. |

(Continued)

FOREIGN PATENT DOCUMENTS

| CN | 1910770 A | 2/2007 |
| DE | 101 17 904 A1 | 10/2002 |

(Continued)

OTHER PUBLICATIONS

International Search Report PCT/EP2011/051199 dated Feb. 22, 2011.

(Continued)

*Primary Examiner* — Patrick Ryan
*Assistant Examiner* — Julian Anthony
(74) *Attorney, Agent, or Firm* — Young & Thompson

(57) ABSTRACT

A substituted lithium-manganese metal phosphate of formula

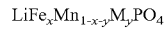

in which M is a bivalent metal from the group Sn, Pb, Zn, Ca, Sr, Ba, Co, Ti and Cd and wherein: x<1, y<0.3 and x+y<1, a process for producing it as well as its use as cathode material in a secondary lithium-ion battery.

16 Claims, 19 Drawing Sheets

(51) Int. Cl.
*H01M 4/136* (2010.01)
*H01M 4/62* (2006.01)
*C01B 25/45* (2006.01)
*H01M 4/36* (2006.01)
*H01M 4/505* (2010.01)
*H01M 4/525* (2010.01)

(56) References Cited

U.S. PATENT DOCUMENTS

| | | |
|---|---|---|
| 7,998,618 B2 | 8/2011 | Nuspl et al. |
| 8,066,916 B2 | 11/2011 | Levasseur et al. |
| 8,105,508 B2 | 1/2012 | Levasseur et al. |
| 8,168,150 B2 | 5/2012 | Hemmer et al. |
| 8,663,847 B2 | 3/2014 | Kashiwa et al. |
| 9,051,184 B2 | 6/2015 | Levasseur et al. |
| 2009/0130559 A1 | 5/2009 | Okada et al. |
| 2010/0084615 A1 | 4/2010 | Levasseur et al. |
| 2010/0327222 A1 | 12/2010 | Levasseur et al. |
| 2012/0085975 A1 | 4/2012 | Levasseur et al. |
| 2012/0129052 A1 | 5/2012 | Bauer et al. |

FOREIGN PATENT DOCUMENTS

| | | |
|---|---|---|
| EP | 1 084 182 B1 | 12/1999 |
| EP | 1 150 367 A2 | 10/2001 |
| EP | 1 936 721 A1 | 6/2008 |
| EP | 1 939 959 A1 | 7/2008 |
| JP | 2002-151082 | 5/2002 |
| JP | 2003520405 A | 7/2003 |
| JP | 2003323894 A | 11/2003 |
| JP | 2004-63422 A | 2/2004 |
| JP | 2009-029670 A | 2/2009 |
| JP | 2009302044 A | 12/2009 |
| JP | 5440959 | 3/2014 |
| KR | 10-2008-0047536 A | 5/2008 |
| KR | 10-2012-0120352 | 11/2012 |
| KR | 10-2012-0123468 A | 11/2012 |
| WO | 01/53198 A1 | 7/2001 |
| WO | WO 02/083555 A2 | 10/2002 |
| WO | WO 2005/051840 A1 | 6/2005 |
| WO | WO 2005/071776 A1 | 8/2005 |
| WO | 2007/034821 A1 | 3/2007 |
| WO | WO 2008/018633 A1 | 2/2008 |
| WO | 2008077448 | 7/2008 |
| WO | WO 2008/077448 A1 | 7/2008 |
| WO | WO 2009/009758 A2 | 1/2009 |
| WO | 2009/117869 A1 | 10/2009 |
| WO | 2009/144600 A2 | 12/2009 |
| WO | 2010-082402 | 7/2010 |
| WO | WO 2010/083247 A1 | 7/2010 |
| WO | WO 2010/130684 A1 | 11/2010 |

OTHER PUBLICATIONS

Padhi, et al., "Phospho-olivines as Positive-Electrode Materials for Rechargeable Lithium Batteries," J. Electrochem. Soc., vol. 144, No. 4, pp. 1188-1194, Apr. 1997.

Ravet et al., 196$^{th}$ Meeting of the Electrochemical Society, Honolulu, Oct. 17-31, 1999.

Herle et al., "Nano-network electronic conduction in iron and nickel olivine phosphates," Nature Materials, vol. 3, pp. 147-151 ( Mar. 2004).

Morgan et al., "Li Conductivity in LixMPO4 (M= Mn, Fe, Co, Ni) Olivine Materials," Electrochemical and Solid State Letters, 7(2), A30-A32 (2004).

Yamada et al., "Electrochemical, Magnetic, and Structural Investigation of the Lix(MnyFe1-y)PO4 Olivine Phases," Chem. Mater. 18, pp. 804-813, 2006.

Losey et al., "Structural Variation in the Lithiophilite-Triphylite Series and Other Olivine-Group Structures,"The Canadian Mineralogist, vol. 42, pp. 1105-1115 (2004).

Molenda et al., "Diffusional Mechanism of Deintercalation in LiFe1-yMNyPO4 Cathode Material," Solid State Ionics, Science Direct, 177, 2617-2624 (2006).

JP Information Submission, dated Jun. 12, 2015; Application No. 2012-550457.

Japanese Office Action dated Aug. 24, 2015, in corresponding priority Application No. 2012-550457. English translation provided.

SUBSTITUTED LITHIUM-MANGANESE METAL PHOSPHATE

CROSS-REFERENCE TO RELATED APPLICATIONS

This application is a U.S. National Stage application claiming benefit of International Application No. PCT/EP2011/051199, filed Jan. 28, 2011, and claiming benefit of German Application No. DE 10 2010 006 077.1, filed Jan. 28, 2010. The entire disclosures of both PCT/EP2011/051199 and DE 10 2010 006 077.1 are incorporated herein by reference.

BACKGROUND

The present invention relates to a novel substituted lithium-manganese metal phosphate, a process for producing it as well as its use as cathode material in a secondary lithium-ion battery.

Since the publications by Goodenough et al. (J. Electrochem. Soc., 144, 1188-1194, 1997) there has been significant interest in particular in using lithium iron phosphate as cathode material in rechargeable secondary lithium-ion batteries. Lithium iron phosphate, compared with conventional lithium compounds based on spinels or layered oxides, such as lithium manganese oxide, lithium cobalt oxide and lithium nickel oxide, offers higher safety properties in the delithiated state such as are required in particular for the use of batteries in future in electric cars, electrically powered tools etc.

Pure lithium iron phosphate material was improved by so-called "carbon coating" (Ravet et al., Meeting of Electrochemical Society, Honolulu, 17-31 Oct. 1999, EP 1 049 182 A2), as an increased capacity of the carbon-coated material is achieved at room temperature (160 mAH/g).

In addition to customary solid-state syntheses (U.S. Pat. No. 5,910,382 C1 or U.S. Pat. No. 6,514,640 C1), a hydrothermal synthesis for lithium iron phosphate with the possibility of controlling the size and morphology of the lithium iron phosphate particles was disclosed in WO 2005/051840.

A disadvantage of lithium iron phosphate is in particular its redox couple $Fe^{3+}/Fe^{2+}$ which has a much lower redox potential vis-à-vis $Li/Li^+$ (3.45 V versus $Li/Li^+$) than for example the redox couple $Co^{3+}/Co_{4+}$ in $LiCoO_2$ (3.9 V versus $Li/Li^+$).

In particular lithium manganese phosphate $LiMnPO_4$ is of interest in view of its higher $Mn_{2+}/Mn_{3+}$ redox couple (4.1 volt) versus $Li/Li^+$. $LiMnPO_4$ was also already disclosed by Goodenough et al., U.S. Pat. No. 5,910,382.

However, the production of electrochemically active and in particular carbon-coated $LiMnPO_4$ has proved very difficult.

The electrical properties of lithium manganese phosphate were improved by iron substitution of the manganese sites:

Herle et al. in Nature Materials, Vol. 3, pp. 147-151 (2004) describe lithium-iron and lithium-nickel phosphates doped with zirconium. Morgan et al. describes in Electrochem. Solid State Lett. 7 (2), A30-A32 (2004) the intrinsic lithium-ion conductivity in $Li_xMPO_4$ (M=Mn, Fe, Co, Ni) olivines. Yamada et al. in Chem. Mater. 18, pp. 804-813, 2004 deal with the electrochemical, magnetic and structural features of $Li_x(Mn_yFe_{1-y})PO_4$, which are also disclosed e.g. in WO2009/009758. Structural variations of $Li_x(Mn_yFe_{1-y})PO_4$, i.e. of the lithiophilite-triphylite series, were described by Losey et al. The Canadian Mineralogist, Vol. 42, pp. 1105-1115 (2004). The practical effects of the latter investigations in respect of the diffusion mechanism of deintercalation in $Li_x(Mn_yFe_{1-y})PO_4$ cathode material are found in Molenda et al. Solid State Ionics 177, 2617-2624 (2006).

However, a plateau-like region occurs for the discharge curves at 3.5 volt vis-à-vis lithium (iron plateau), the length of which compared with pure $LiMnPO_4$ increases as the iron content increases, which results in a loss of energy density (see Yamada et al. in the publication mentioned above). The slow kinetics (charge and discharge kinetics) of manganese-containing metal phosphates, in particular $Li_x(Mn_yFe_{1-y})PO_4$ with y>0.8, have so far made the use of these compounds for battery applications largely impossible.

SUMMARY

The object of the present invention was therefore to provide suitable lithium-manganese phosphate derivatives which make possible a high energy density when used as cathode material and provide a high redox potential with rapid kinetics in respect of charge and discharge processes.

This object is achieved by a substituted lithium-manganese metal phosphate of formula $$LiFe_xMn_{1-x-y}M_yPO_4$$

in which M is a bivalent metal, in particular from the group Sn, Pb, Zn, Ca, Sr, Ba, Co, Ti and Cd and wherein: x<1, y<0.3 and x+y<1.

In developments of the invention, the bivalent metal is M, Zn, Mg, Ca or combinations thereof, in particular Zn and Ca. It has surprisingly been shown within the framework of the present invention that these electrically inactive substitution elements make possible the provision of materials with particularly high energy density when they are used as electrode materials.

It was found that in the case of the substituted lithium metal phosphate of the present invention $LiFe_xMn_{1-x-y}M_yPO_4$, the value for y lies in the range of more than 0.07 to 0.20 and is 0.1 in one embodiment.

The substitution (or doping) by the bivalent metal cations that are in themselves electrochemically inactive seems to deliver the very best results at values of x=0.1 and y=0.1-0.15, preferably 0.1-0.13, in particular 0.11±0.1 with regard to energy density of the material according to the invention. For the doping with magnesium ($LiMn_{1-x-y}Mg_yPO_4$), values slightly different from Zn and Ca were found. Here, 0.01≤x≤0.11 and 0.07<y<20, preferably 0.075≤y≤15 and x+y must be <0.2. This means that a high manganese content with a relatively low iron content and a relatively high magnesium content deliver the best results in respect of energy density, which is particularly surprising in view of the electrically inactive character of magnesium. It was found that for compounds according to the invention such as $LiMn_{0.80}Fe_{0.10}Zn_{0.10}PO_4$, $LiMn_{0.80}Fe_{0.10}Zn_{0.10}PO_y$, and $LiMn_{0.80}Fe_{0.10}Ca_{0.10}PO_4$ the specific capacity is exactly as high as for $LiMn_{0.56}Fe_{0.33}Zn_{0.10}PO_4$ and the 4V plateau is longer, which means an increase in energy density.

In further embodiments of the present invention, the value for x in the mixed lithium metal phosphate according to the invention of general formula $LiFe_xMn_{1-x-y}M_yPO_4$ is 0.15-0.4, particularly preferably 0.05-2, quite particularly preferably 0.15±0.3, in particular 0.33. This value, in particular in conjunction with the above-named value for y of 0.1 gives the most preferred compromise between energy density and current carrying capacity of the material according to the invention. This means that the compound $LiFe_xMn_{1-x-y}M_yPO_4$ for M=Zn or Ca with x=0.33 and y=0.10 has a current carrying capacity up to 20 C during discharge comparable with that of LiFePO$_4$ of the state of the art (e.g. available from Süd-Chemie), but in addition also an increase in energy density (approx. 20% vis-à-vis LiFePO$_4$ (measured against a lithium titanate (Li$_4$Ti$_5$O$_{12}$) anode)).

In further embodiments of the present invention, the substituted lithium-manganese metal phosphate also comprises carbon. The carbon is particularly preferably evenly distributed throughout the substituted lithium-manganese metal phosphate. In other words, the carbon forms a type of matrix in which the lithium-manganese metal phosphate according to the invention is embedded. It makes no difference for the meaning of the term "matrix" used here whether e.g. the carbon particles serve as "nucleation sites" for the LiFe$_x$Mn$_{1-x-y}$M$_y$PO$_4$ according to the invention, i.e. whether these settle on the carbon, or whether, as in a particularly preferred development of the present invention, the individual particles of the lithium-manganese metal phosphate LiFe$_x$Mn$_{1-x-y}$M$_y$PO$_4$ are covered in carbon, i.e. sheathed or in other words coated. Both variants are considered equivalent according to the invention and come under the above definition.

Important for the purpose of the present invention is merely that the carbon is evenly distributed in the substituted lithium-manganese metal phosphate LiFe$_x$Mn$_{1-x-y}$M$_y$PO$_4$ according to the invention and forms a type of (three-dimensional) matrix. In advantageous developments of the present invention, the presence of carbon or a carbon matrix can make obsolete the further addition of electrically conductive additives such as e.g. conductive carbon black, graphite etc. when using the LiFe$_x$Mn$_{1-x-y}$M$_y$PO$_4$ according to the invention as electrode material.

In a development of the invention, the proportion of carbon relative to the substituted lithium-manganese metal phosphate is ≤4 wt.-%, in further embodiments ≤2.5 wt.-%, in still further embodiments ≤2.2 wt.-% and in still further embodiments ≤2.0 wt.-%. Thus the best energy densities of the material according to the invention are achieved according to the invention.

The substituted lithium-manganese metal phosphate LiFe$_x$Mn$_{1-x-y}$M$_y$PO$_4$ according to the invention is preferably contained as active material in a cathode for a secondary lithium-ion battery. As stated, this cathode can also contain the LiFe$_x$Mn$_{1-x-y}$M$_y$PO$_4$ according to the invention without further addition of a further conductive material such as e.g. conductive carbon black, acetylene black, ketjen black, graphite etc. (in other words be free of added conductive agent), both in the case of the carbon-containing LiFe$_x$Mn$_{1-x-y}$M$_y$PO$_4$ according to the invention and the carbon-free LiFe$_x$Mn$_{1-x-y}$M$_y$PO$_4$.

In further preferred embodiments, the cathode according to the invention contains a further lithium-metal-oxygen compound. This addition increases the energy density by up to approx. 10-15%, depending on the type of the further mixed lithium metal compound compared with cathodes which contain only the LiFe$_x$Mn$_{1-x-y}$M$_y$PO$_4$ according to the invention as sole active material.

The further lithium-metal-oxygen compound is preferably selected from substituted or non-substituted LiCoO$_2$, LiMn$_2$O$_4$, Li(Ni,Mn,Co)O$_2$, Li(Ni,Co,Al)O$_2$ and LiNiO$_2$, as well as LiMnFePO$_4$, LiFePO$_4$, LiCoPO$_4$, LiMnPO$_4$ and mixtures thereof.

The object is further achieved by a process for producing a mixed lithium-manganese metal phosphate according to the invention comprising the following steps:
a. producing a mixture containing a Li starting compound, a Mn starting compound, an Fe starting compound, a M$^{2+}$ starting compound and a PO$_4^{3-}$ starting compound until a precipitate or a suspension in aqueous solution forms,
b. carrying out a dispersion or grinding treatment of the mixture and/or the suspension. This treatment is preferably carried out until the D$_{90}$ value of the particles in the mixture is less than 50 μm, preferably at most 25 μm;
c. obtaining LiFe$_x$Mn$_{1-x-y}$M$_y$PO$_4$, wherein x and y have the above-named meanings, from the suspension by reaction under hydrothermal conditions.

By "hydrothermal conditions" is meant here temperatures of 100° C. to 200° C., preferably 100° C. to 160° C. and quite particularly preferably 100° C. to 130° C. as well as a pressure of 1 bar to 40 bar vapour pressure. In particular, it has surprisingly been shown that the synthesis at the quite particularly preferred temperature of 100-130° C., in particular at 130±5° C., leads to an increase in the specific capacity of the thus-obtained LiFe$_x$Mn$_{1-x-y}$M$_y$PO$_4$ according to the invention compared with reaction at more than 160° C.

As stated, the synthesis takes place in aqueous solution/ suspension. At the end of the reaction, the pH of the reaction solution is approx. 6, i.e. the reaction itself takes place in non-basic environment.

The process according to the invention makes possible in particular the production of phase-pure LiFe$_x$Mn$_{1-x-y}$M$_y$PO$_4$ which is free of impurities to be determined by means of XRD.

There is therefore also a further aspect of the present invention in the provision of LiFe$_x$Mn$_{1-x-y}$M$_y$PO$_4$ which can be obtained by means of the process according to the invention.

In preferred developments of the process according to the invention, the dispersion or grinding treatment begins before or during the suspension formation and is continued until the suspension/precipitation has concluded.

Preferably, the dispersion or grinding treatment starts before the suspension/precipitation of the mixture in order to bring about an increased nucleation and in order to prevent the formation of large crystals and crystal agglomerates.

After the hydrothermal treatment, the LiFe$_x$Mn$_{1-x-y}$M$_y$PO$_4$ obtained according to the invention is separated off by filtration and/or centrifuging as well as dried and, in preferred developments of the invention, disagglomerated, e.g. by grinding with an air-jet mill.

In developments of the process according to the invention, a carbon-containing material is added during step a) or c). This can be either pure carbon, such as e.g. graphite, acetylene black or ketjen black, or else a carbon-containing precursor compound which then decomposes when exposed to the action of heat to carbon, e.g. starch, gelatine, a polyol, a sugar such as mannose, fructose, sucrose, lactose, galactose, a partially water-soluble polymer such as e.g. a polyacrylate etc.

Alternatively, the LiFe$_x$Mn$_{1-x-y}$M$_y$PO$_4$ obtained after the hydrothermal treatment can also be mixed with a carbon-containing material as defined above or impregnated with an aqueous solution of same. This can take place either directly after the isolation (filtration) of the LiFe$_x$Mn$_{1-x-y}$M$_y$PO$_4$ or after it has been dried or disagglomerated.

For example the mixture of LiFe$_x$Mn$_{1-x-y}$M$_y$PO$_4$ and carbon precursor compound (which was added e.g. during the process) or the LiFe$_x$Mn$_{1-x-y}$M$_y$PO$_4$ impregnated with the carbon precursor compound is then dried and heated to a temperature between 500° C. and 850° C., wherein the carbon precursor compound is pyrolyzed to pure carbon which then wholly or at least partly covers the $LiFe_xMn_{1-x-y}M_yPO_4$ particles as a layer.

The pyrolysis is usually followed by a grinding or disagglomeration treatment.

The $LiFe_xMn_{1-x-y}M_yPO_4$ obtained according to the invention is preferably dried under protective gas, in air or under vacuum at temperatures of from 50° C. to 200° C., preferably under protective gas and the pyrolysis preferably likewise under protective gas, preferably nitrogen.

Within the framework of the process according to the invention, the $Li^+$ source, the $Fe^{2+}$ and $Mn^{2+}$ sources as well as the $M^{2+}$ source are preferably used in the form of aqueous solutions and the $PO_4^{3-}$ source in the form of a liquid, e.g. as $H_3PO_4$ or an aqueous solution.

In preferred embodiments of the process according to the invention, the $Li^+$ source is first dissolved in an aqueous solvent, the $Fe^{2+}$, the $Mn^{2+}$ and the $M^{2+}$ sources as well the $PO_4^{3-}$ source are then added and mixed under inert gas atmosphere. The reaction then takes place under hydrothermal conditions and preferably under protective gas.

According to the invention, $Li_2O$, $LiCl$, $LiNO_3$, $LiOH$ or $Li_2CO_3$, preferably $LiOH$ or $Li_2CO_3$, is used as lithium source.

The Fe source is preferably an $Fe^{2+}$ salt, in particular $FeSO_4$, $FeCl_2$, $FeNO_3$, $Fe_3(PO_4)_2$ or an Fe organyl salt.

The Mn source is preferably a water-soluble manganese (II) salt such as manganese sulphate, manganese acetate, manganese oxalate, manganese chloride, manganese nitrate, manganese hydroxide, manganese carbonate etc.

According to the invention, phosphoric acid, a metal phosphate, hydrogen phosphate or dihydrogen phosphate is preferably used as $PO_4^{3-}$ source.

In particular, the corresponding sulphates, in particular of Mg, Zn and Ca, or the corresponding halides, nitrates, acetates, carboxylates come into consideration as source for the bivalent metal cation.

The invention is explained in more detail below with reference to examples and drawings which are not, however, to be considered limiting.

DETAILED DESCRIPTION

Embodiment Examples

1. Determination of the Particle-Size Distribution

Figure 1:
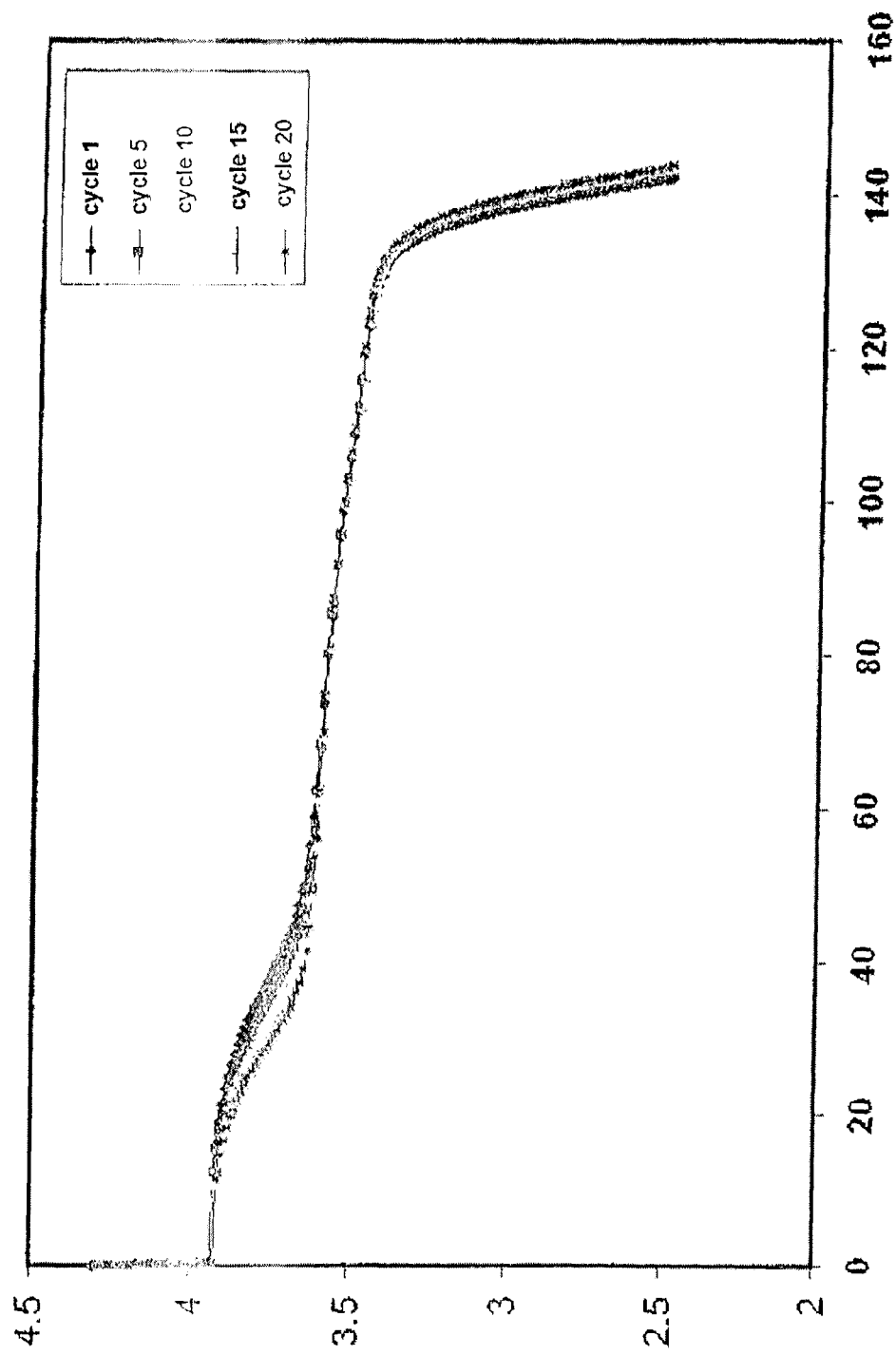
FIG. 1 discharge curves at 1 C for a lithium-manganese iron phosphate $LiMn_{0.66}Fe_{0.33}PO_4$ of the state of the art.

The particle-size distributions for the mixtures or suspensions and of the produced material is determined using the light-scattering method using devices customary in the trade. This method is known per se to a person skilled in the art, wherein reference is also made in particular to the disclosure in JP 2002-151082 and WO 02/083555. In this case, the particle-size distributions were determined with the help of a laser diffraction measurement apparatus (Mastersizer S, Malvern Instruments GmbH, Herrenberg, Del.) and the manufacturer's software (version 2.19) with a Malvern Small Volume Sample Dispersion Unit, DIF 2002 as measuring unit. The following measuring conditions were chosen: compressed range; active beam length 2.4 mm; measuring range: 300 RF; 0.05 to 900 μm. The sample preparation and measurement took place according to the manufacturer's instructions.

The $D_{90}$ value gives the value at which 90% of the particles in the measured sample have a smaller or the same particle diameter. Accordingly, the $D_{50}$ value and the $D_{10}$ value give the value at which 50% and 10% respectively of the particles in the measured sample have a smaller or the same particle diameter.

According to a particularly preferred embodiment according to the invention, the values named in the present description are valid for the $D_{10}$ values, $D_{50}$ values, the $D_{90}$ values as well as the difference between the $D_{90}$ and $D_{10}$ values relative to the volume proportion of the respective particles in the total volume. Accordingly, according to this embodiment according to the invention, the $D_{10}$, $D_{50}$ and $D_{90}$ values named here give the values at which 10 volume-% and 50 volume-% and 90 volume-% respectively of the particles in the measured sample have a smaller or the same particle diameter. If these values are preserved, particularly advantageous materials are provided according to the invention and negative influences of relatively coarse particles (with relatively larger volume proportion) on the processability and the electrochemical product properties are avoided. Particularly preferably, the values named in the present description are valid for the $D_{10}$ values, the $D_{50}$ values, the $D_{90}$ values as well as the difference between the $D_{90}$ and the $D_{10}$ values relative to both percentage and volume percent of the particles.

For compositions (e.g. electrode materials) which, in addition to the lithium-manganese iron phosphates according to the invention substituted with bivalent metal cations, contain further components, in particular for carbon-containing compositions, the above light scattering method can lead to misleading results as the $LiFe_xMn_{1-x-y}M_yPO_4$ particles can be joined together by the additional (e.g. carbon-containing) material to form larger agglomerates. However, the particle-size distribution of the material according to the invention can be determined as follows for such compositions using SEM photographs:

A small quantity of the powder sample is suspended in acetone and dispersed with ultrasound for 10 minutes. Immediately thereafter, a few drops of the suspension are dropped onto a sample plate of a scanning electron microscope (SEM). The solids concentration of the suspension and the number of drops are measured such that a largely single-ply layer of powder particles (the German terms "Partikel" and "Teilchen" are used synonymously to mean "particle") forms on the support in order to prevent the powder particles from obscuring one another. The drops must be added rapidly before the particles can separate by size as a result of sedimentation. After drying in air, the sample is placed in the measuring chamber of the SEM. In the present example, this is a LEO 1530 apparatus which is operated with a field emission electrode at 1.5 kV excitation voltage and a 4 mm space between samples. At least 20 random sectional magnifications of the sample with a magnification factor of 20,000 are photographed. These are each printed on a DIN A4 sheet together with the inserted magnification scale. On each of the at least 20 sheets, if possible at least 10 free visible particles of the material according to the invention, from which the powder particles are formed together with the carbon-containing material, are randomly selected, wherein the boundaries of the particles of the material according to the invention are defined by the absence of fixed, direct connecting bridges. On the other hand, bridges formed by carbon material are included in the particle boundary. Of each of these selected particles, those with the longest and shortest axis in the projection are measured in each case with a ruler and converted to the actual particle dimensions using the scale ratio. For each measured $LiFe_xMn_{1-x-y}M_yPO_4$ particle, the arithmetic mean from the longest and the shortest axis is defined as particle diameter. The measured $LiFe_xMn_{1-x-y}M_yPO_4$ particles are then divided analogously to the light-scattering measurement into size classes. The differential particle-size distribution relative to the number of particles is obtained by plotting the number of the associated particles in each case against the size class. The cumulative particle-size distribution from which $D_{10}$, $D_{50}$ and $D_{90}$ can be read directly on the size axis is obtained by continually totaling the particle numbers from the small to the large particle classes.

The described process is also applied to battery electrodes containing the material according to the invention. In this case, however, instead of a powder sample a fresh cut or fracture surface of the electrode is secured to the sample holder and examined under a SEM.

Example 1

Production of $LiMn_{0.56}Fe_{0.33}Zn_{0.10}PO_4$ According to the Process According to the Invention When producing the material it is to be borne in mind that the material is precipitated from an aqueous $Fe^{2+}$ precursor solution. The reaction and drying/sintering is therefore preferably to be carried out under protective gas or vacuum in order to avoid a partial oxidation of $Fe^{2+}$ to $Fe^{3+}$ with formation of by-products such as $Fe_2O_3$ or $FePO_4$.

Production and Precipitation/Suspension of a Precursor Mixture

First, 105.5 g lithium hydroxide $LiOH.H_2O$ was dissolved in 0.9 l distilled water. This solution is called basic solution.

77.43 g $FeSO_4 \times 7\ H_2O$, 79.88 g $MnSO_4 \times H_2O$ and 24.27 g $ZnSO_4 \times 7\ H_2O$ were dissolved in approx. 1.5 l distilled water and 103.38 g 80% phosphoric acid added slowly accompanied by stirring. 0.4 l distilled wash water was added. This solution is called acid solution.

The basic solution was introduced into the laboratory autoclave (capacity: 4 liters) at 600 rpm stirrer speed, the autoclave loaded with approx. 6-7 bar nitrogen via the dipping tube and relieved again via the vent valve. The procedure was repeated three times.

A disperser (IKA, ULTRATURRAX® UTL 25 Basic Inline with dispersion chamber DK 25.11) was connected to the autoclave between vent valve and bottom outlet valve in order to carry out the dispersion or grinding treatment. The pumping direction of the disperser was bottom outlet valve-disperser-vent valve. The disperser was started on the middle power level (13,500 rpm) according to the manufacturer's instructions.

The prepared acid solution was then pumped with a membrane pump via the dipping tube into the autoclave (stroke 100%, 180 strokes/minute; corresponds to the maximum capacity of the pump) and reflushed with approx. 500 to 600 ml distilled water. The pumping-in lasted for approx. 20 minutes, wherein the temperature of the resultant suspension increased to approx. 40° C. After pumping-in of the acid solution, a deposit precipitated out.

The disperser, which was started before the addition of the acid solution, was used for a total of approx. 1 hour for intensive mixing or grinding of the resultant, viscous suspension (after pumping-in of the acid solution at 50° C.).

The use of a disperser brings about an intensive mixing and the agglomeration of the precipitated viscous premixture. During the precipitation and crystallization of the suspension, a homogeneous mixture of many small, approximately equally-sized crystal nuclei formed in the disperser as a result of the pre-grinding or intensive mixing. These crystal nuclei crystallized during the subsequent hydrothermal treatment (see below) to very uniformly grown crystals of the end-product with a very narrow particle-size distribution. The power and energy input via the dispersion treatment was respectively more than 7 $kW/m^3$ and more than 7 $kWh/m^3$ of the treated precursor mixture/suspension.

Hydrothermal Treatment

Each freshly produced suspension was subjected to hydrothermal treatment in the laboratory autoclave. Before heating the suspension, the autoclave was flushed with nitrogen in order to expel any air present from the autoclave before the hydrothermal process. The product according to the invention formed starting from hydrothermal temperatures of approximately 100 to 120° C. The hydrothermal treatment was preferably carried out for 2 hours at 130° C.

After switching off and disconnecting the disperser the mixture was heated over 1.5 hours to 130° C., for 2 hours. Cooling to 30° C. then took place over 3 hours.

The $LiMn_{0.56}Fe_{0.33}Zn_{0.10}PO_4$ according to the invention was then able to be dried in air or in the drying oven for example at mild temperatures (40° C.) without visible oxidation.

The thus-obtained material was pumped under nitrogen atmosphere through the bottom outlet valve of the autoclave into a pressure filter (Seitz filter). The membrane pump setting was such that a pressure of 5 bar was not exceeded. The filter cake was subsequently washed with distilled water until the conductivity of the wash water had fallen below 42 µS/cm.

Example 2

Production of $LiMn_{0.56}Fe_{0.33}Mg_{0.10}PO_4$

The synthesis was carried out as in Example 1, except that 20.80 g $MgSO_4*7H_2O$ was used as starting material in the corresponding molar weight quantities instead of $ZnSO_4$.

Example 3

Production of $LiMn_{0.80}Fe_{0.10}Zn_{0.10}PO_4$ According to the Process According to the Invention The synthesis was carried out as in Example 1, except that 114.12 g $MnSO_4*7H_2O$, 23.46 g $FeSO_4*7H_2O$, 24.27 g $ZnSO_4*7H_2O$, 103.38 g $H_3PO_4$, (80%) were used as starting materials in the corresponding molar weight quantities.

Example 4

Production of $LiMn_{0.85}Fe_{0.10}Zn_{0.05}PO_4$ According to the Process According to the Invention The synthesis was carried out as in Example 1, except that 121.26 g $MnSO_4*1H_2O$, 23.46 g $FeSO_4*7H_2O$, 12.14 g $ZnSO_4*7H_2O$, 103.38 g $H_3PO_4$ (80%) were used as starting materials in the corresponding molar weight quantities.

Example 5

Carbon Coating of the Obtained Material (Variant 1)

The filter cakes obtained in Examples 1 to 4 were impregnated with a solution of 24 g lactose in water and then calcined at 750° C. for 3 hours under nitrogen.

Depending on the quantity of lactose, the proportion of carbon in the product according to the invention was between 0.2 and 4 wt.-%.

Typically 1 kg dry product from Examples 1 and 2 was mixed intimately with 112 g lactose monohydrate and 330 g deionized water and dried overnight in a vacuum drying oven at 105° C. and <100 mbar to a residual moisture of 3%. The brittle drying product was broken by hand and coarse-ground in a disk mill (Fritsch Pulverisette 13) with a 1 mm space between disks and transferred in high-grade steel cups into a protective gas chamber furnace (Linn KS 80-S). The latter was heated to 750° C. within 3 hours at a nitrogen stream of 200 I/h, kept at this temperature for 3 hours and cooled over 3 hours to room temperature. The carbon-containing product was disagglomerated in a jet mill (Hosokawa).

The SEM analysis of the particle-size distribution produced the following values: $D_{50}$<0.5 µm, difference between $D_{90}$ and $D_{10}$ value: <1 µm.

Example 6

Carbon Coating of the Material According to the Invention (Variant 2)

The synthesis of the materials according to the invention was carried out as in Examples 1 to 4, except that gelatine was also then added (9 g gelatine per 100 g starting product) during the precipitation step a). The end-product contained approx. 2.3 wt.-% carbon.

Example 7

Production of Electrodes

Thin-film electrodes as disclosed for example in Anderson et al., Electrochem. and Solid State Letters 3 (2) 2000, pages 66-68 were produced. The electrode compositions usually consisted of 90 parts by weight active material, 5 parts by weight Super P carbon and 5% polyvinylidene fluoride as binder or 80 parts by weight active material, 15 wt.-% Super P carbon and 5 parts by weight polyvinylidene fluoride, or 95 parts by weight active material and 5 parts by weight polyvinylidene fluoride.

The active material was mixed, together with the binder (or, for the electrodes of the state of the art, with the added conductive agent), in N-methylpyrrolidone, applied to a pretreated (primer) aluminium foil by means of a coating knife and the N-methylpyrrolidone was evaporated at 105° C. under vacuum. The electrodes were then cut out (13 mm diameter) and roll-coated with a roller at room temperature. The starting nip width was e.g. 0.1 mm and the desired thickness progressively built up in steps of 5-10 µm. 4 rolled coats were applied at each step and the foil was rotated by 1800. After this treatment, the thickness of the coating was between 20-25 µm. The primer on the aluminium foil consisted of a thin carbon coating which improves the adhesion of the active material particularly when the active material content of the electrode is more than 85 wt.-%.

The electrodes were then dried overnight at 120° C. under vacuum and assembled and electrochemically measured against lithium metal in half cells in an argon-filled glove-box.

The electrochemical measurements were carried out against lithium metal using LP30 (Merck, Darmstadt) as electrolyte (EC (ethylene carbonate):DMC (dimethylcarbonate)=1:1, 1 M $LiPF_6$).

The test procedure was carried out in CCCV mode, i.e. cycles with a constant current at the C/10 rate for the first, and at the C rate for the subsequent, cycles. In some cases, a constant voltage portion followed at the voltage limits (1.0 and 2.0 volt versus $Li/Li^+$) until the current fell approximately to the C/50 rate, in order to complete the charge/discharge cycle.

Corresponding measurements of the specific capacity and the current carrying capacity were carried out on both $LiMn_{0.66}Fe_{0.33}PO_4$ of the state of the art and materials according to the invention substituted with magnesium and zinc. $LiFePO_4$ electrodes (available from Süd-Chemie) were likewise also measured.

FIG. 1 shows the discharge curves at 1 C for a $LiMn_{0.66}Fe_{0.33}PO_4$ of the state of the art.

Figure 2:
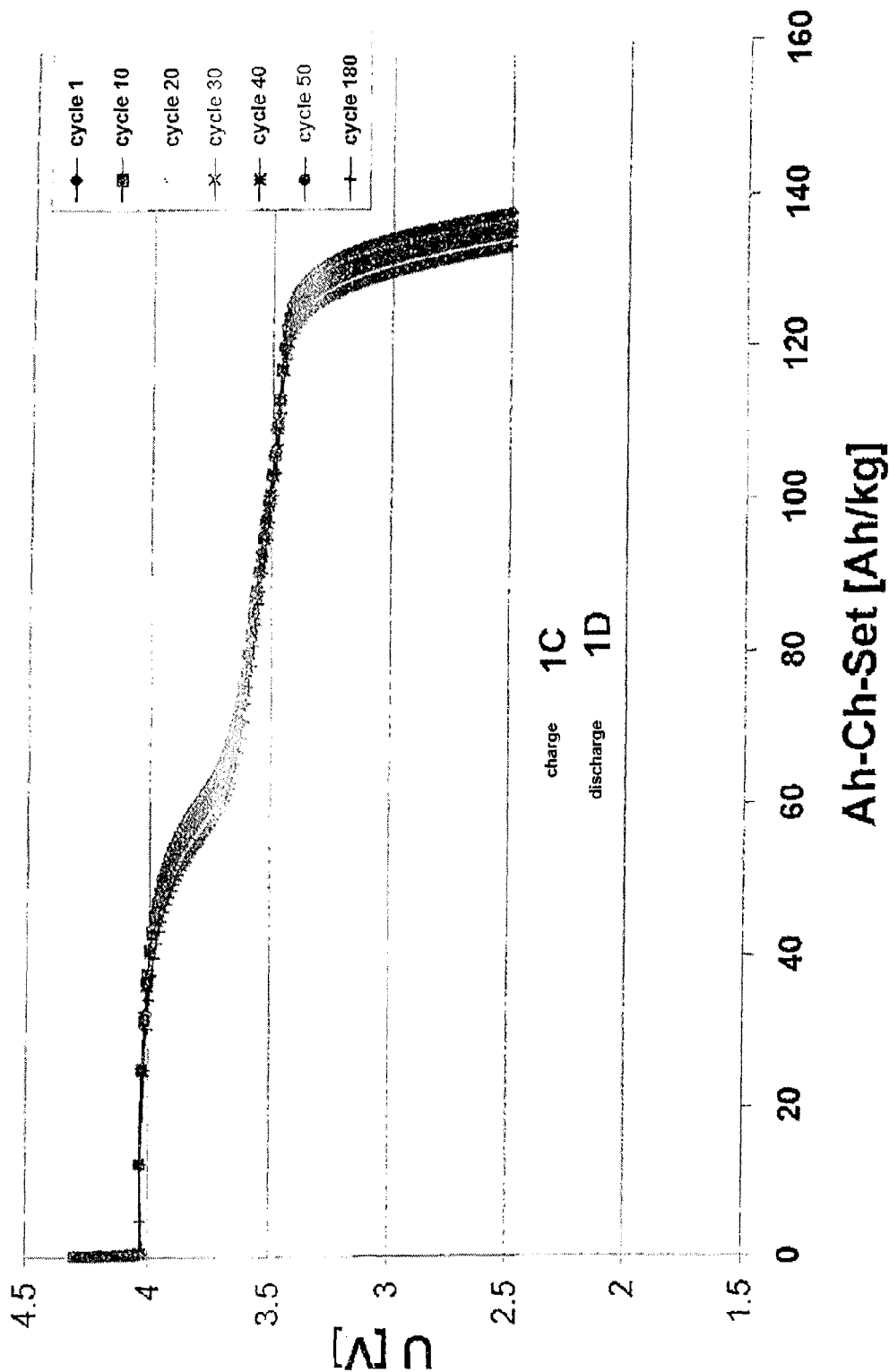
FIG. 2 discharge curves at 1 C for the $LiMn_{0.56}Fe_{0.33}Mg_{0.10}PO_4$ according to the invention.
Figure 3:
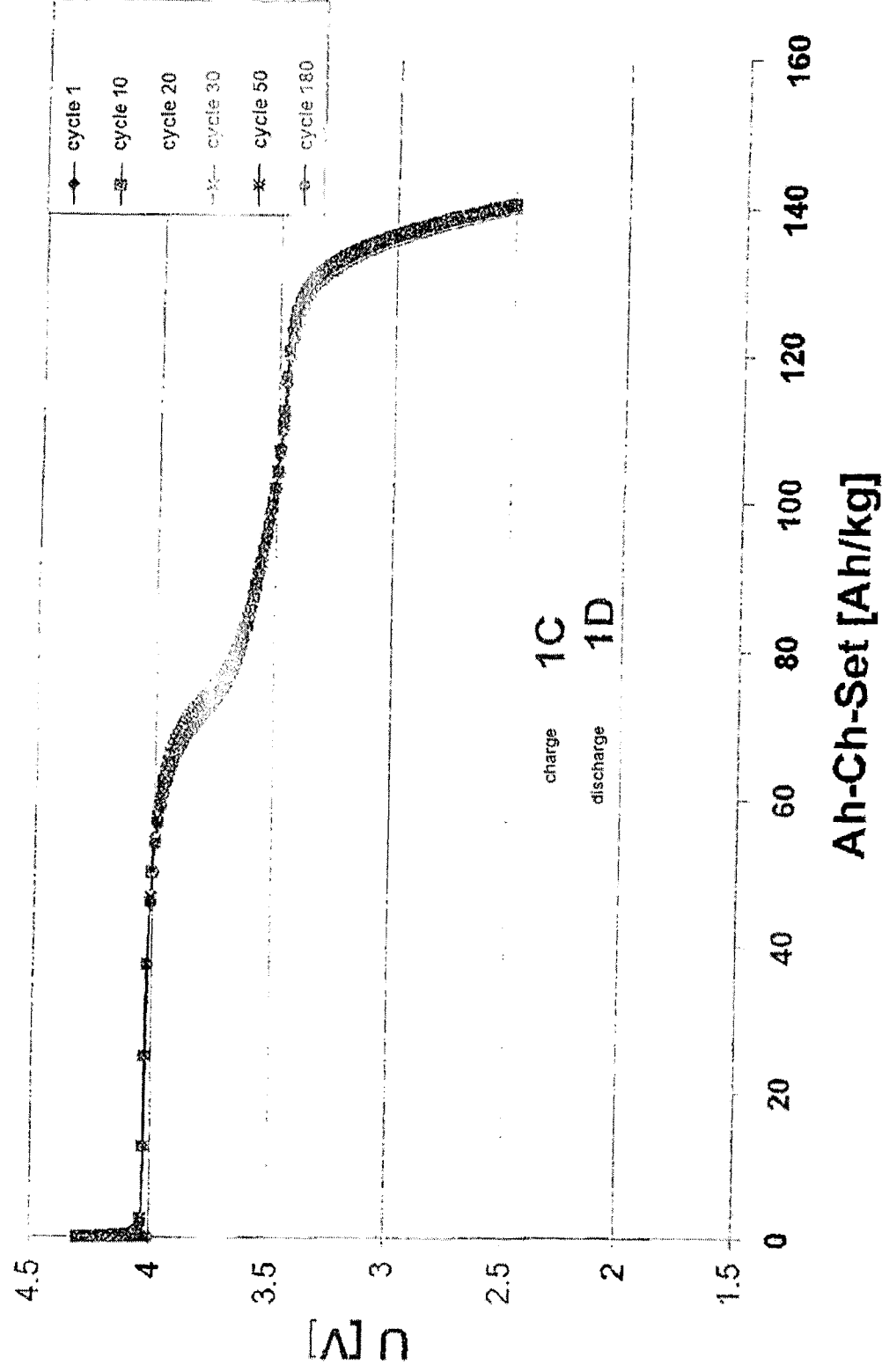
FIG. 3 discharge curves at 1 C for the $LiMn_{0.56}Fe_{0.33}Zn_{0.10}PO_4$ according to the invention.

After several cycles, an energy loss is recorded in the range of between 20 and 40 mAh/g. In contrast, the magnesium- and zinc-substituted materials according to the invention (FIGS. 2 and 3) display almost no energy loss in the range of between 20 and 60 mAh/g even after 180 cycles. Nor is any weakening in the capacity at 140 mAh/g to be ascertained even after extended cycles.

Figure 4:
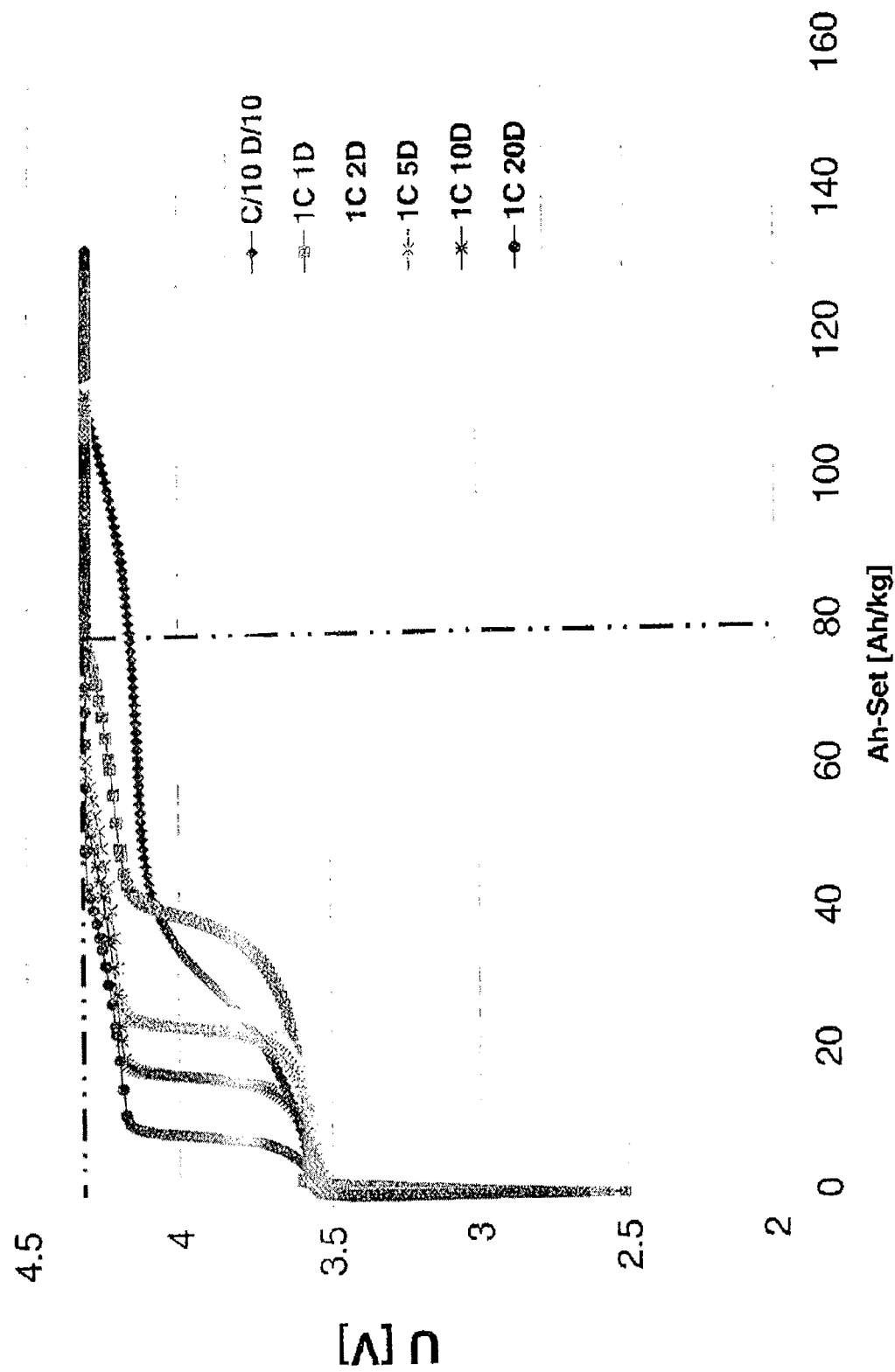
FIG. 4 the charge curves of lithium-manganese iron phosphate $(LiMn_{0.66}Fe_{0.33}PO_4)$ of the state of the art.
Figure 5:
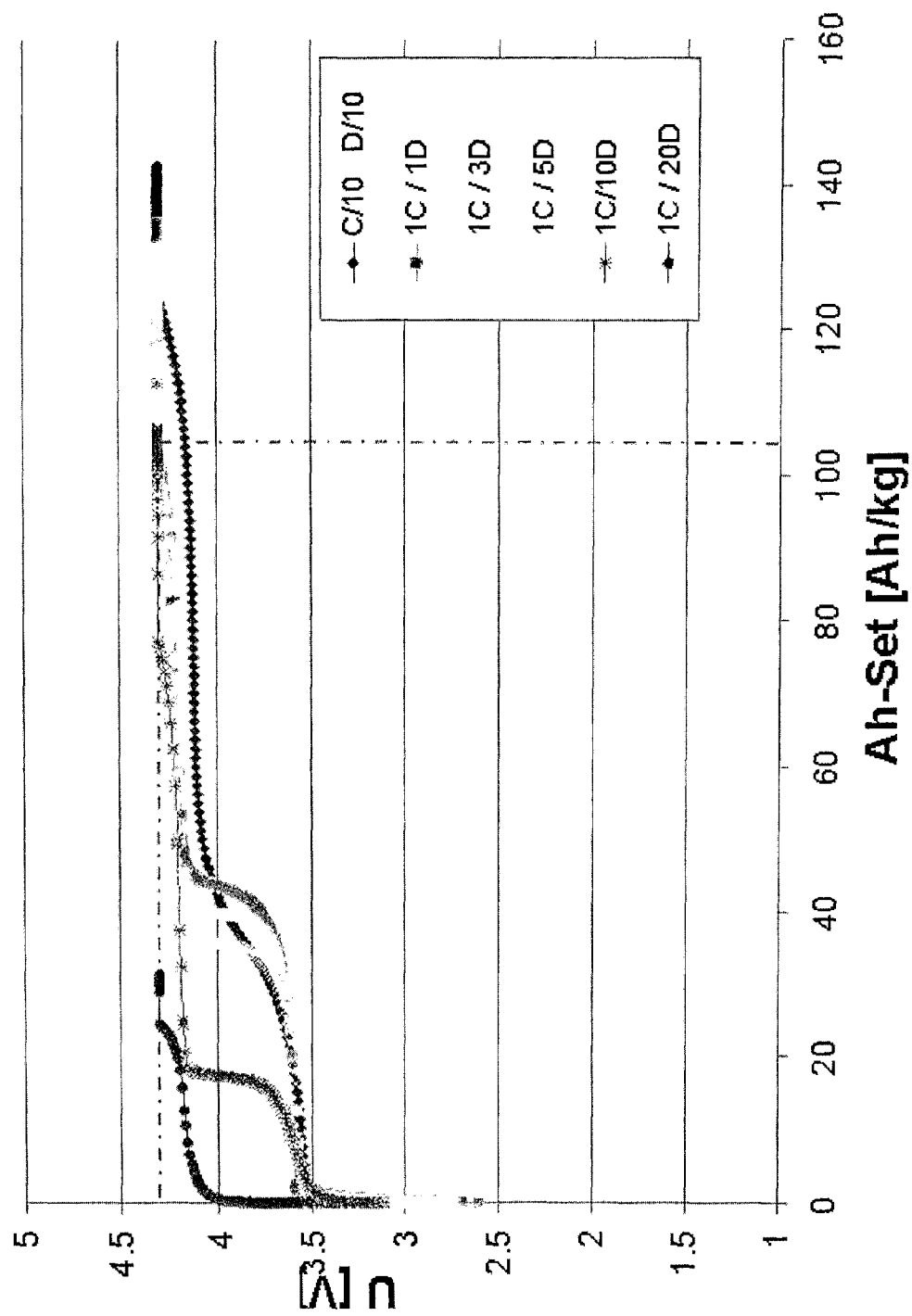
FIG. 5 the charge curves of $LiMn_{0.56}Fe_{0.33}Zn_{0.10}PO_4$ according to the invention.

FIG. 4 shows charge curves of a $LiMn_{0.66}Fe_{0.33}PO_4$ material of the state of the art with an electrode density of 1.2 g/cm$^3$ and a thickness of 20 µm. By way of comparison, the charge curve for the zinc-containing material according to the invention is shown in FIG. 5. As can be seen from FIGS. 4 and 5, the 1 C value of the material according to the invention is much better during the charge up to 4.3V than in the case of the comparison material of the state of the art.

Figure 6:
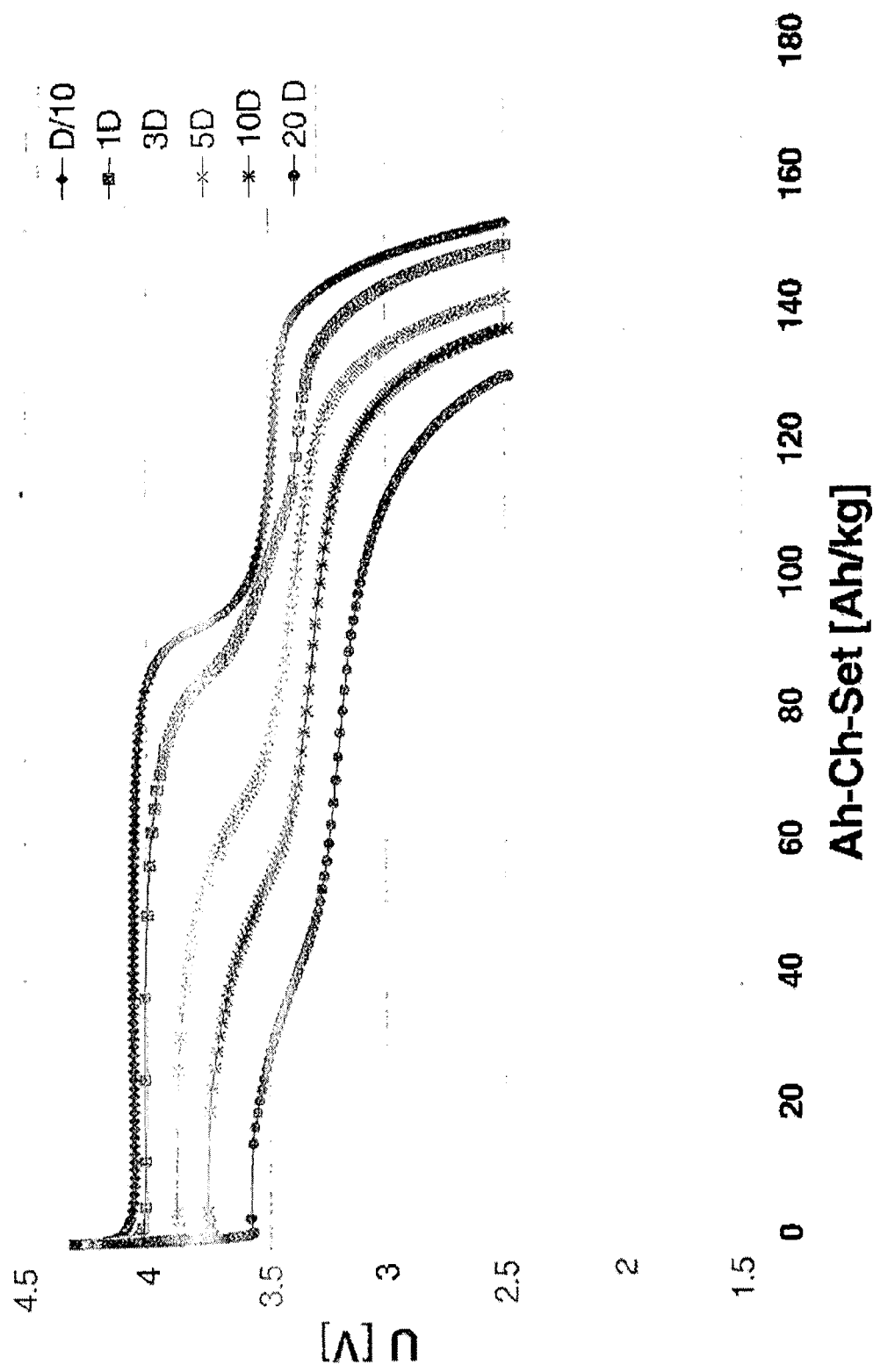
FIG. 6 the discharge curves at different rates for an electrode containing $LiMn_{0.56}Fe_{0.33}Zn_{0.10}PO_4$ according to the invention.
Figure 7:
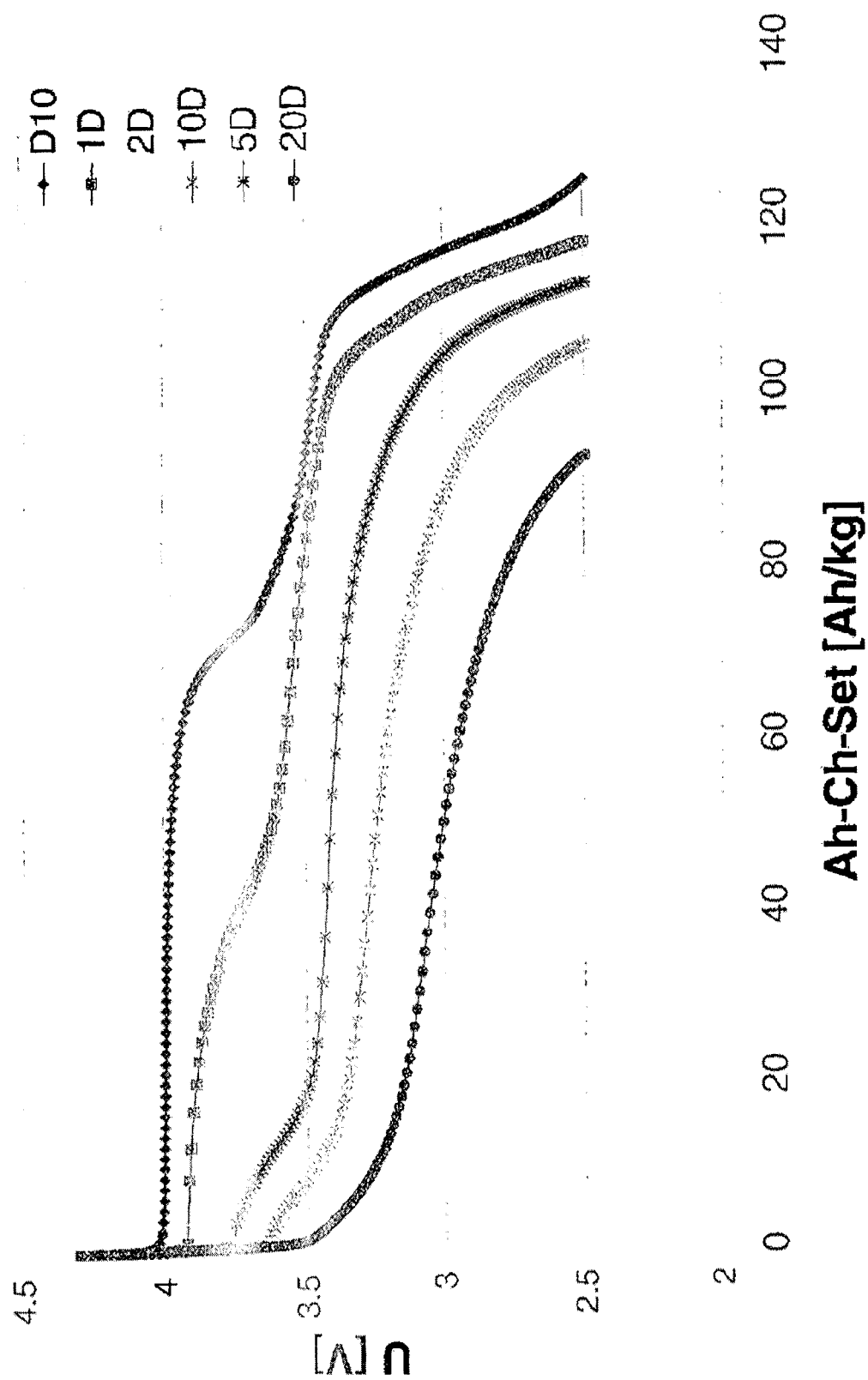
FIG. 7 the discharge curves at different rates for an electrode containing $LiMn_{0.66}Fe_{0.33}PO_4$ according to the state of the art.

FIGS. 6 and 7 show the discharge capacity at different rates of the material according to the invention (FIG. 6) as well as of a lithium-manganese iron phosphate of the state of the art (FIG. 7). The electrode density was 1.2 g/cm³ in the material according to the invention and 1.3 g/cm³ in the comparison material at a thickness of approx. 20 µm.

Here also, there is a significant drop in performance after several discharge cycles of the lithium-manganese iron phosphate not substituted with (electrically inactive) bivalent material compared with the lithium-manganese iron phosphate not substituted with a bivalent metal ion. In addition, the polarization at increased current rates is much greater for the lithium-manganese iron phosphate of the state of the art than for a substituted lithium-manganese iron phosphate according to the invention.

Figure 8A:
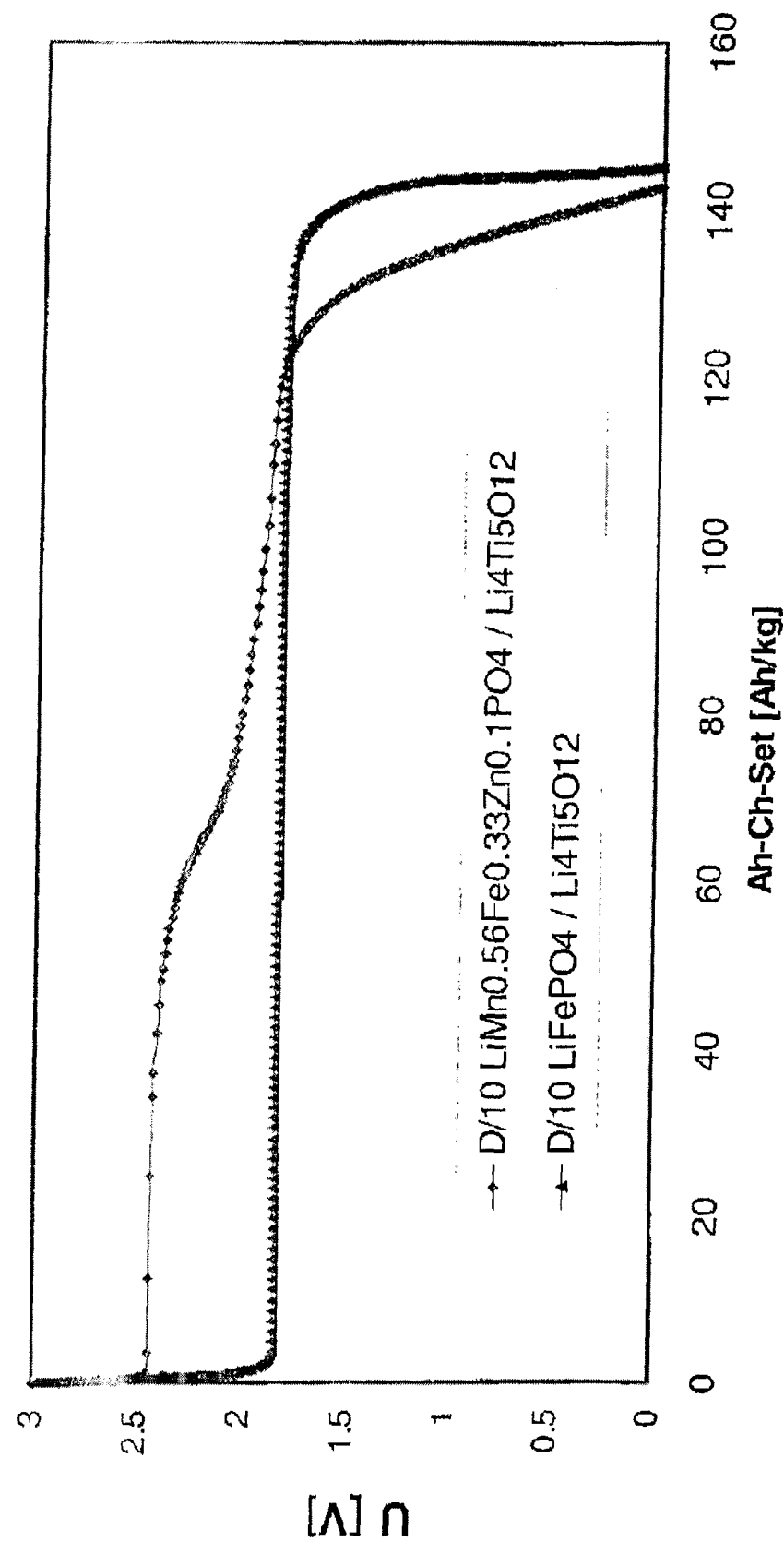
FIG. 8a-b the comparison of the materials according to the invention with $LiFePO_4$ in full cells versus a lithium titanate anode, at C/10 (FIG. 8a) and at 20 C (FIG. 8b)
Figure 8B:
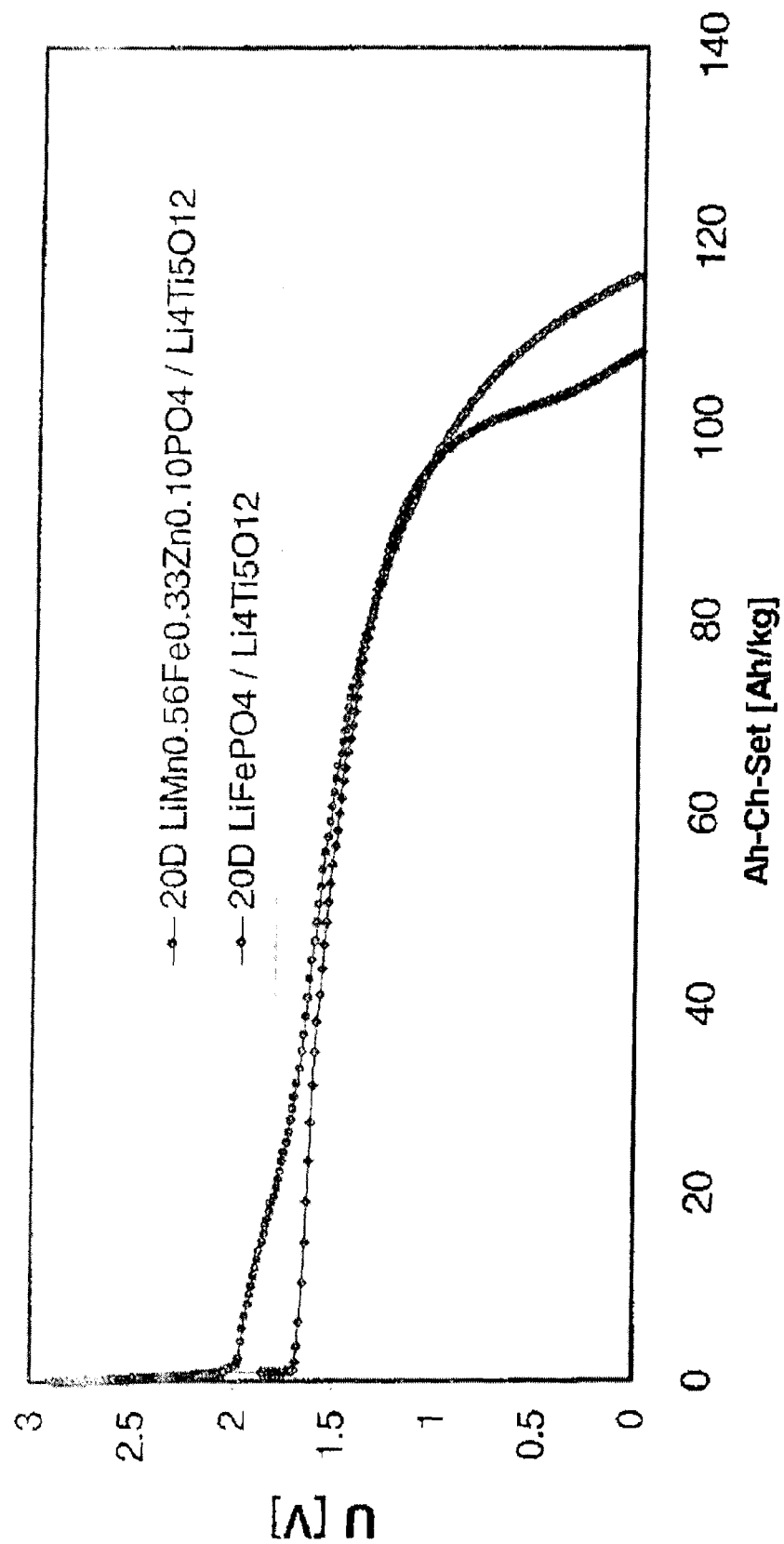

FIG. 8*a-b* shows the discharge curves in full-cell configuration versus a lithium titanate ($Li_4Ti_5O_{12}$) anode at D/10 and at 20D for a carbon-coated lithium iron phosphate of the state of the art (available from Süd-Chemie) and for the $LiMn_{0.56}Fe_{0.33}Zn_{0.10}PO_4$ material according to the invention. The electrode composition was 90 wt.-% active material, 5% Super P graphite and 5 wt.-% polyvinylidene fluoride. The cell was balanced such that the mass of the cathode and the mass of the anode were as similar as possible.

Here it is shown that the $LiMn_{0.56}Fe_{0.33}Zn_{0.1}PO_4$ material according to the invention has a long 4-volt plateau up to 80 mAh/g and at the same time a specific discharge capacity at D/10 comparable to the (carbon-coated) lithium iron phosphate of the state of the art, which means a clear increase in the energy density vis-à-vis lithium iron phosphate.

Figure 9:
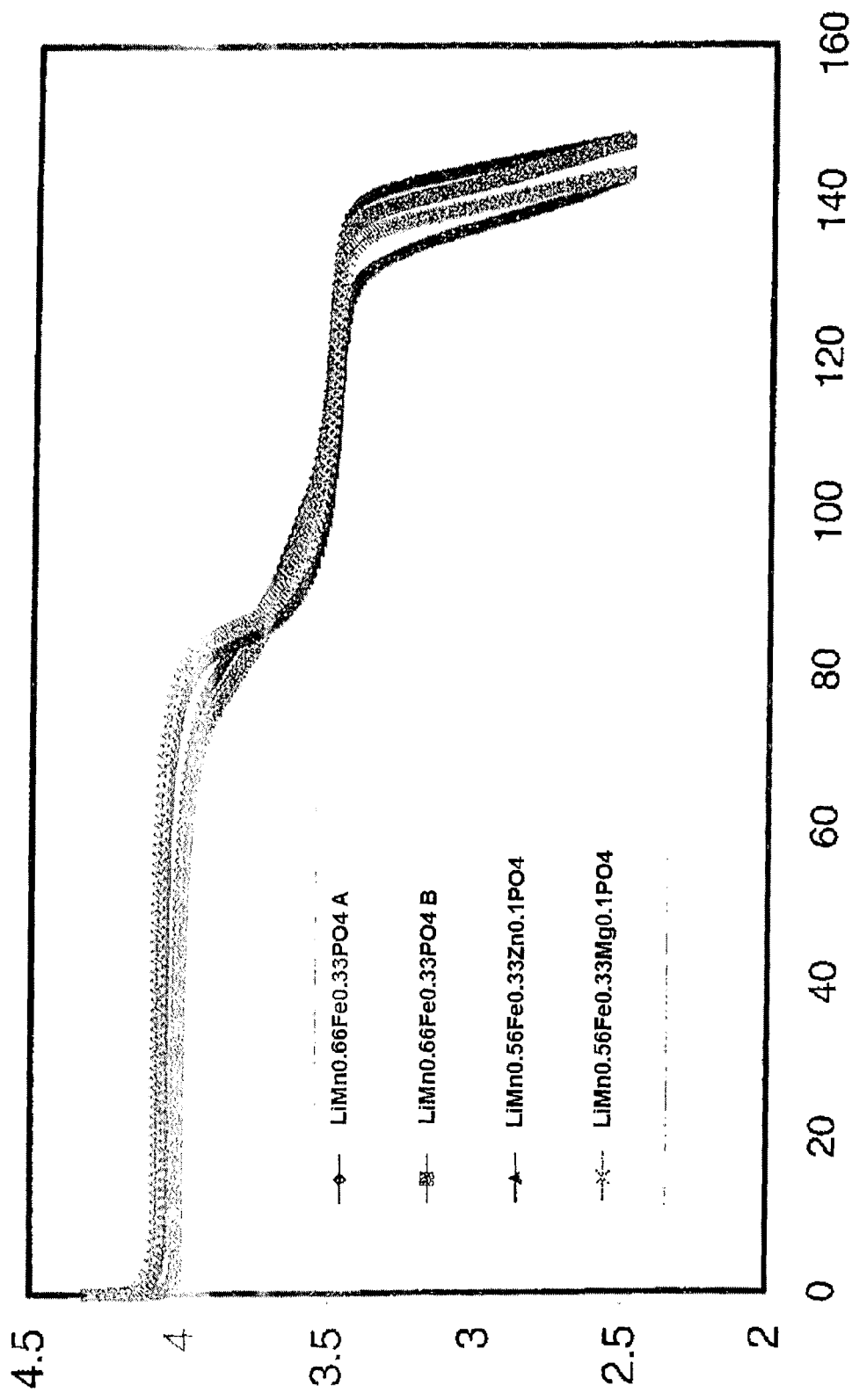
FIG. 9 the comparison of the specific discharge capacity at C/10 between a lithium-manganese iron phosphate $(LiMn_{0.66}Fe_{0.33}PO_4)$ of the state of the art with substituted lithium-manganese metal phosphates according to the invention.

FIG. 9 shows the C/10 or discharge capacity of $LiMn_{0.56}Fe_{0.33}Zn_{0.10}PO_4$ and $LiMn_{0.56}Fe_{0.33}Mg_{0.10}PO_4$ materials according to the invention compared with two $LiMn_{0.66}Fe_{0.33}PO_4$ materials of the state of the art. Here also it can surprisingly be seen that an increase in the manganese plateau potential is achieved by zinc and magnesium substitutions, although in these cases Mg and zinc are electrically inactive ions and the manganese content is smaller than in the case of the materials of the state of the art.

Figure 10:
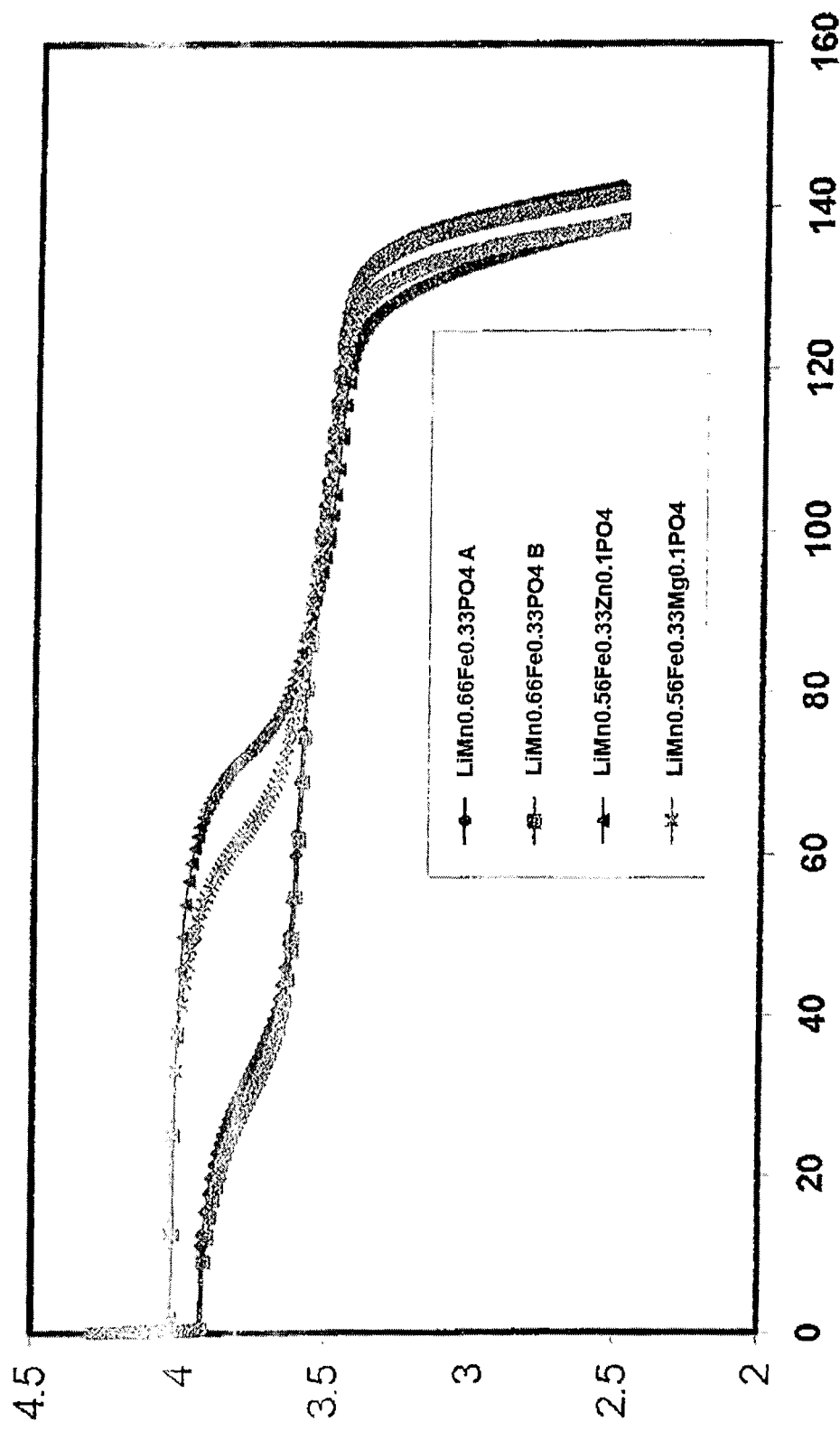
FIG. 10 voltage profiles at 1 C after aging of materials according to the invention vis-à-vis lithium-manganese iron phosphate $(LiMn_{0.66}Fe_{0.33}PO_4)$ of the state of the art.

After 20 cycles, the charge and discharge cycles at C/10 and 1D for the $LiMn_{0.56}Fe_{0.33}Zn_{0.10}PO_4$ and $LiMn_{0.56}Fe_{0.33}Mg_{0.10}PO_4$ materials according to the invention and for lithium-manganese iron phosphates of the state of the art (FIG. 10) were measured. Here also a stabilization of the length of the 4-volt manganese plateau by the materials according to the invention compared with lithium-manganese iron phosphate of the state of the art is shown.

Figure 11A:
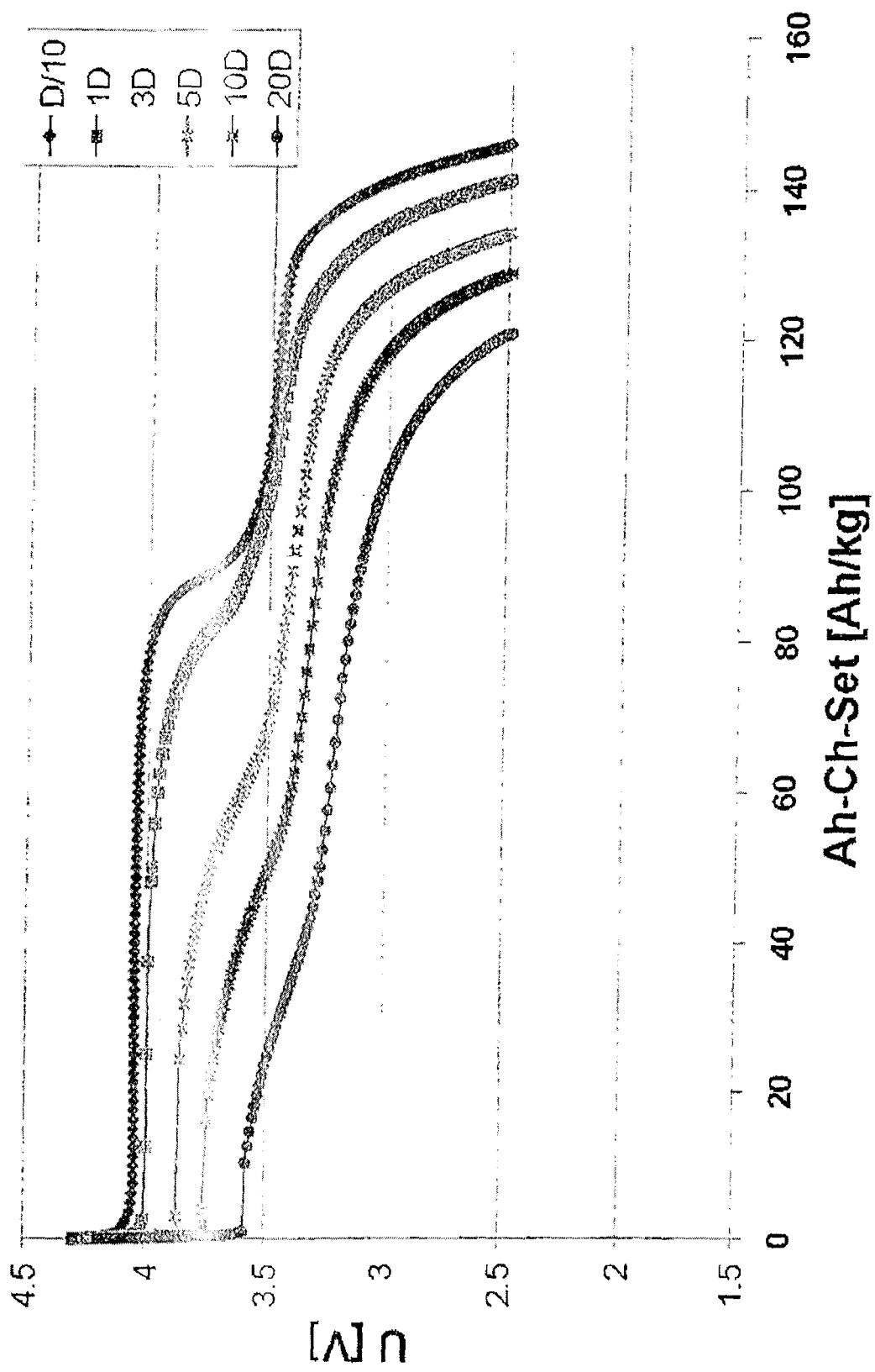
FIGS. 11a-c the influence of the electrode density on the discharge rate in the case of material according to the invention.
Figure 11B:
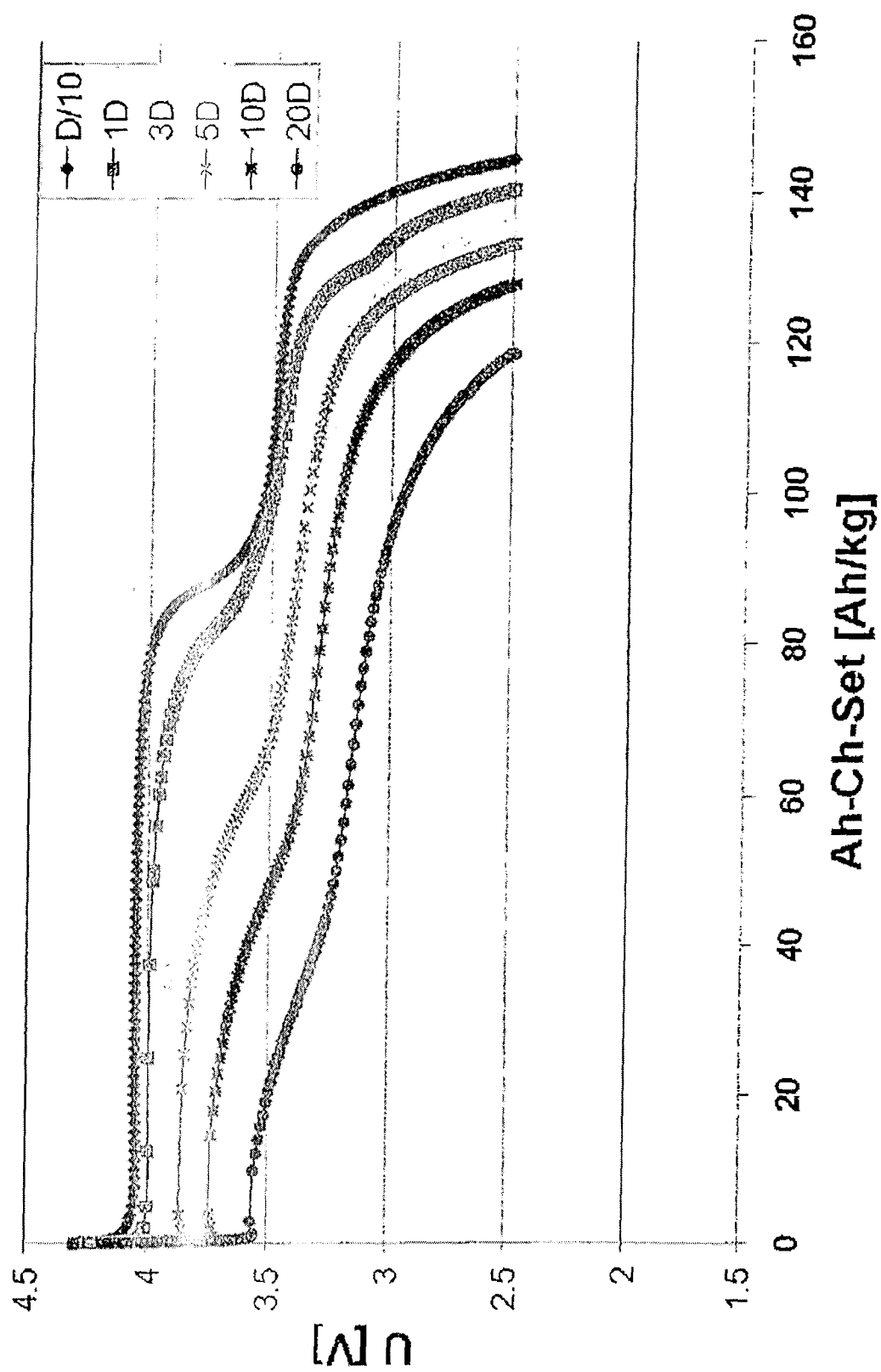
Figure 11C:
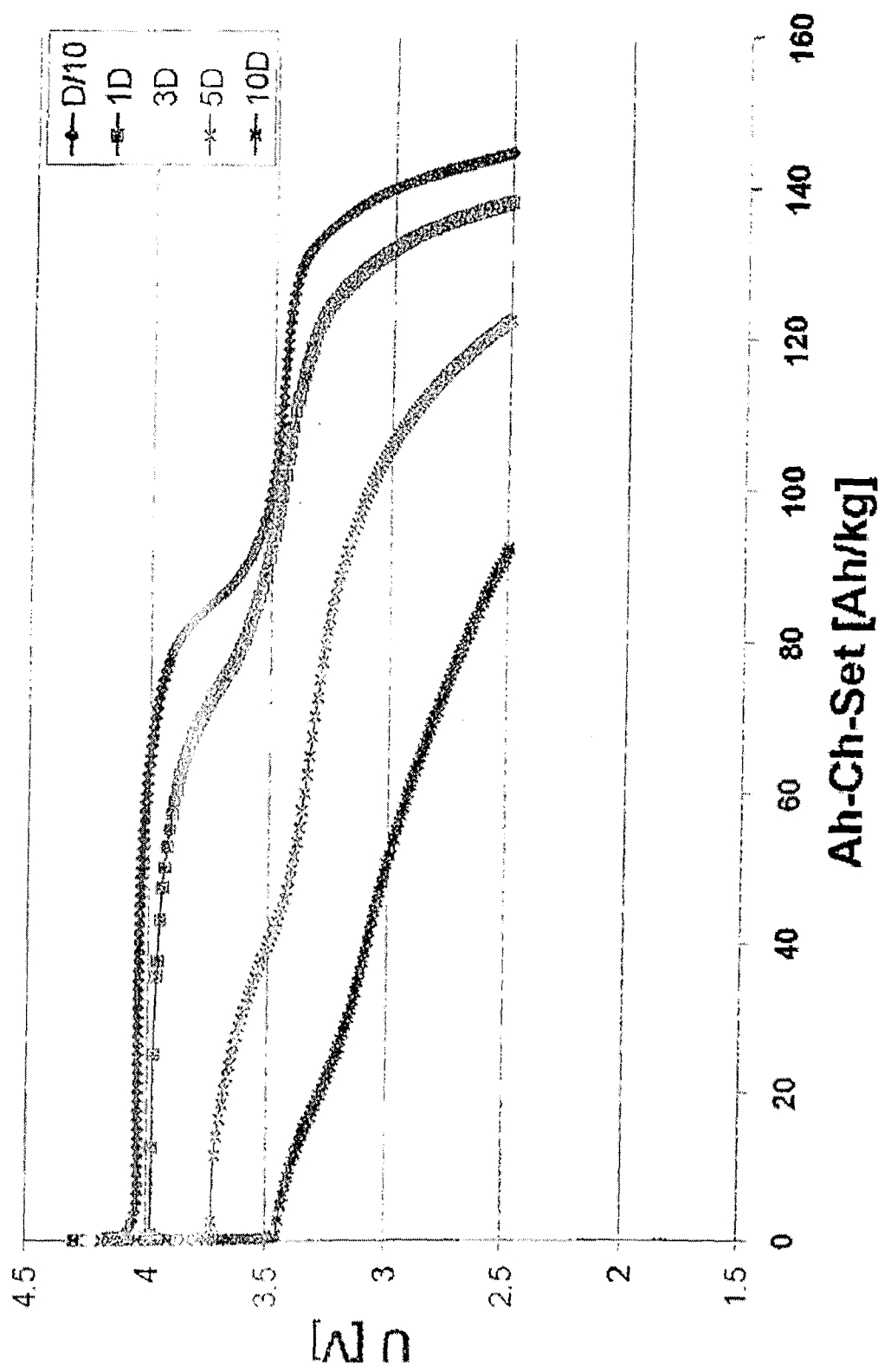

FIGS. 11*a* to *c* show the variation in electrode density relative to the discharge capacities at different rates. In FIG. 11*a*, the density of the material is 1.6 g/cm³, in FIG. 11*b* 1.7 g/cm³ and in FIG. 11*c* 2.0 g/cm³.

It is shown that it is possible with the materials according to the invention to increase the electrode density while preserving the discharge capacities.

Figure 12A:
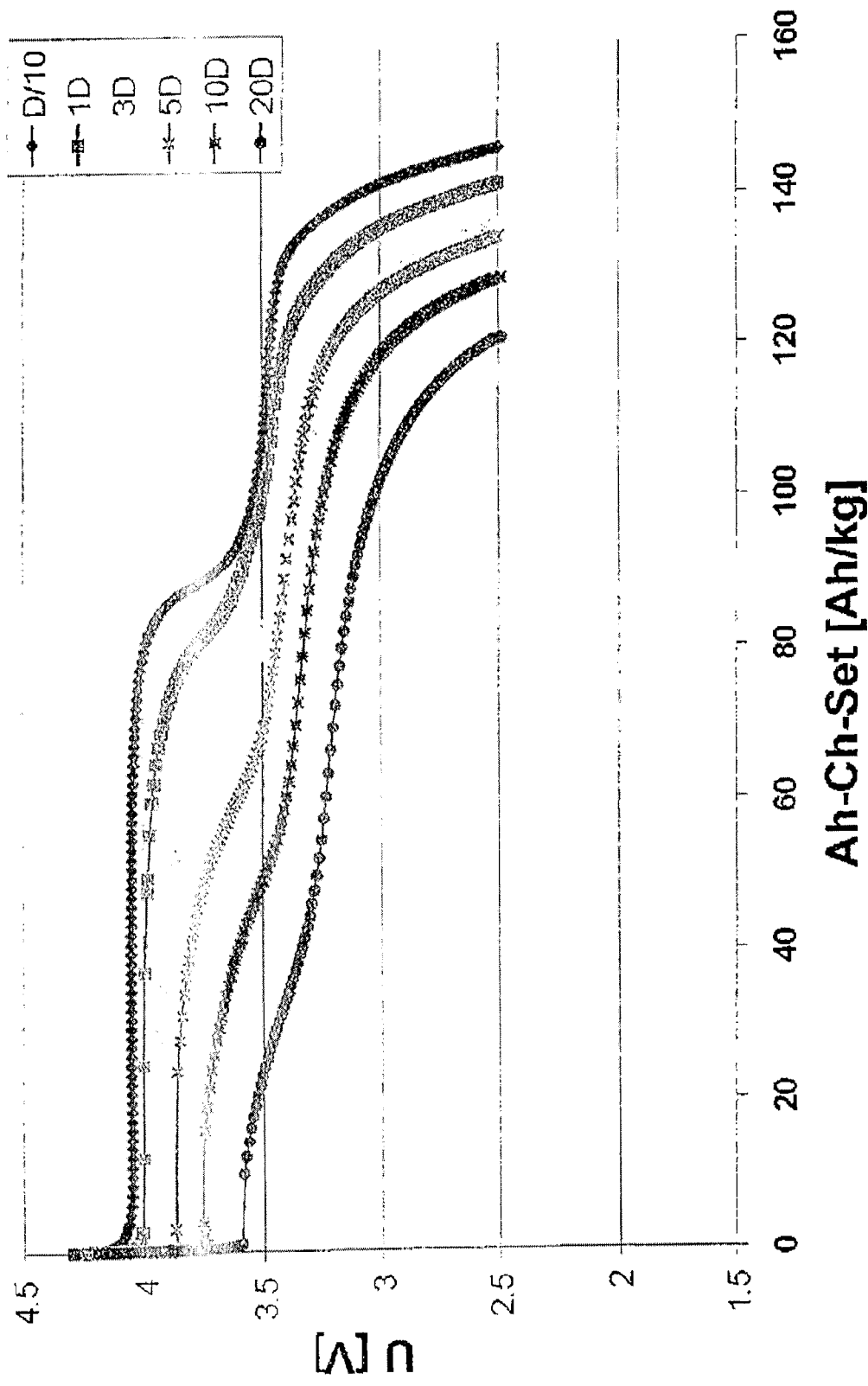
FIGS. 12a-c the influence of the electrode density in the case of a cathode containing the material according to the invention.
Figure 12B:
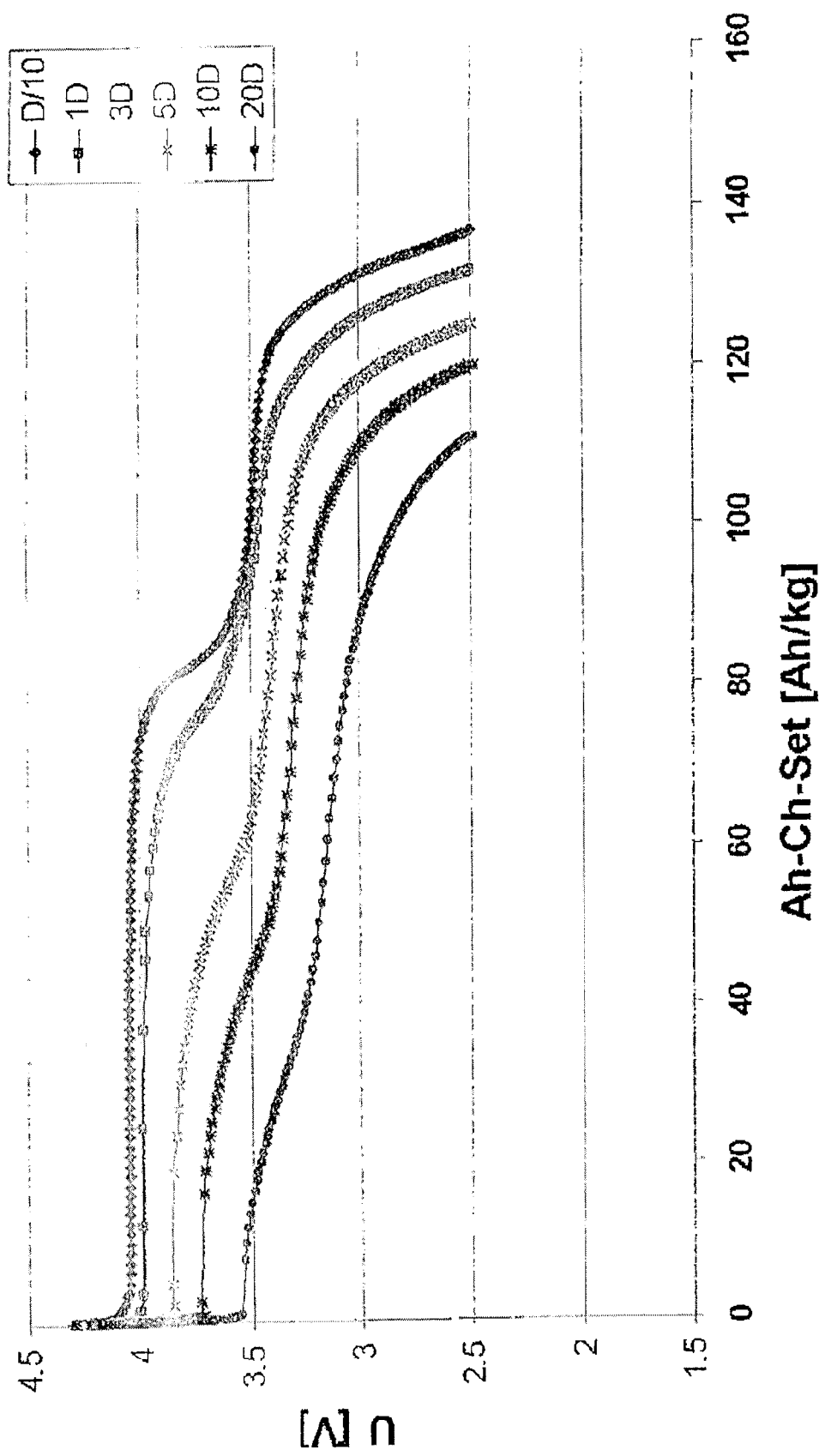
Figure 12C:
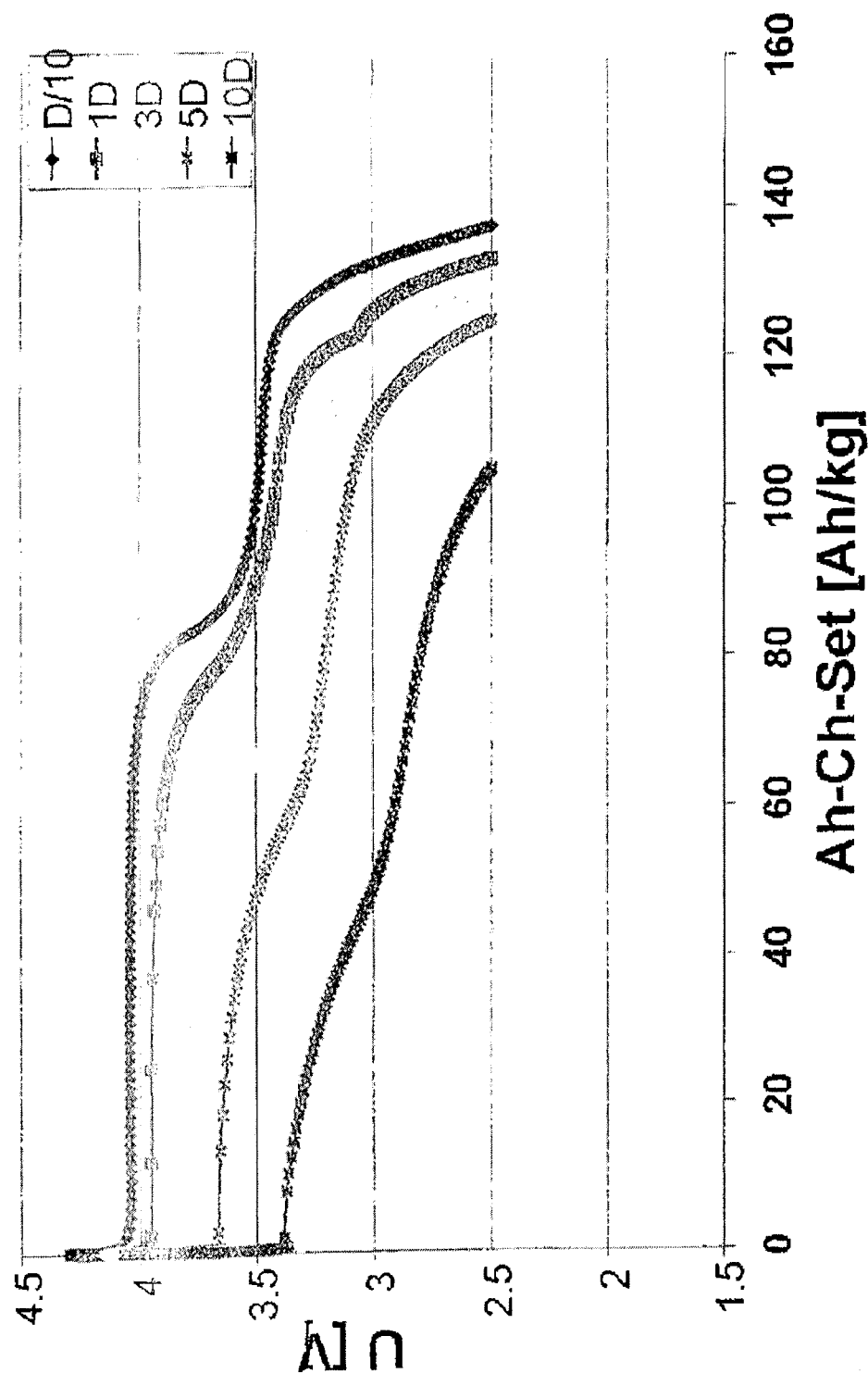

FIGS. 12*a* to *c* show the influence of the electrode thickness on the discharge capacities. The thickness of the electrodes in FIG. 12*a* was 25 µm, in FIG. 12*b* 33 µm and in FIG. 12*c* 51 µm. It is shown here also that the plateau can be kept at 4 volt and the discharge capacity at least up to 5 C, and the active matter load can simultaneously be increased.

Even higher energy densities can be achieved by increasing the manganese content of these substituted materials according to the invention.

Figure 13:
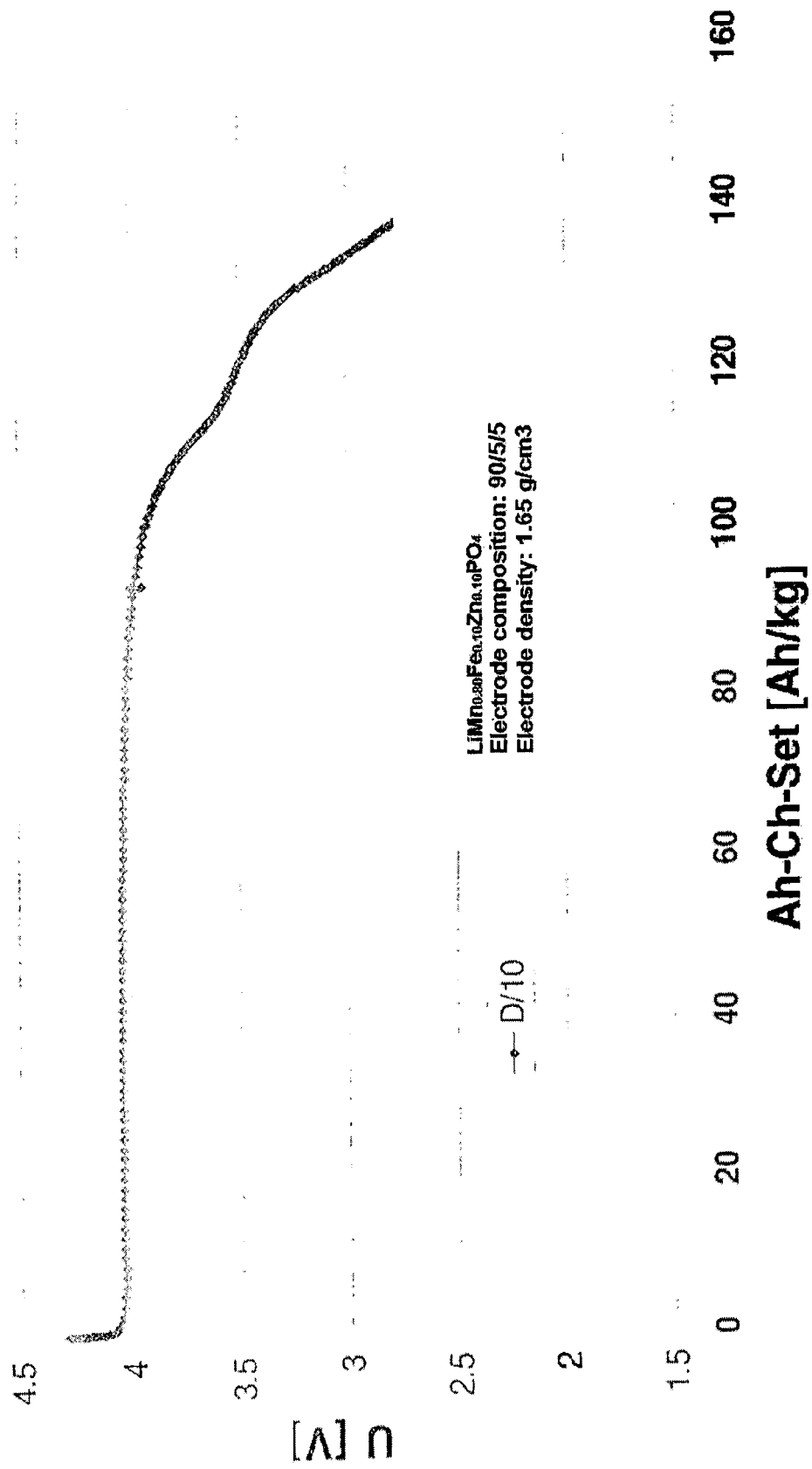
FIG. 13 the discharge curve at C/10 for $LiMn_{0.80}Fe_{0.10}Zn_{0.10}PO_4$ according to the invention.
Figure 14:
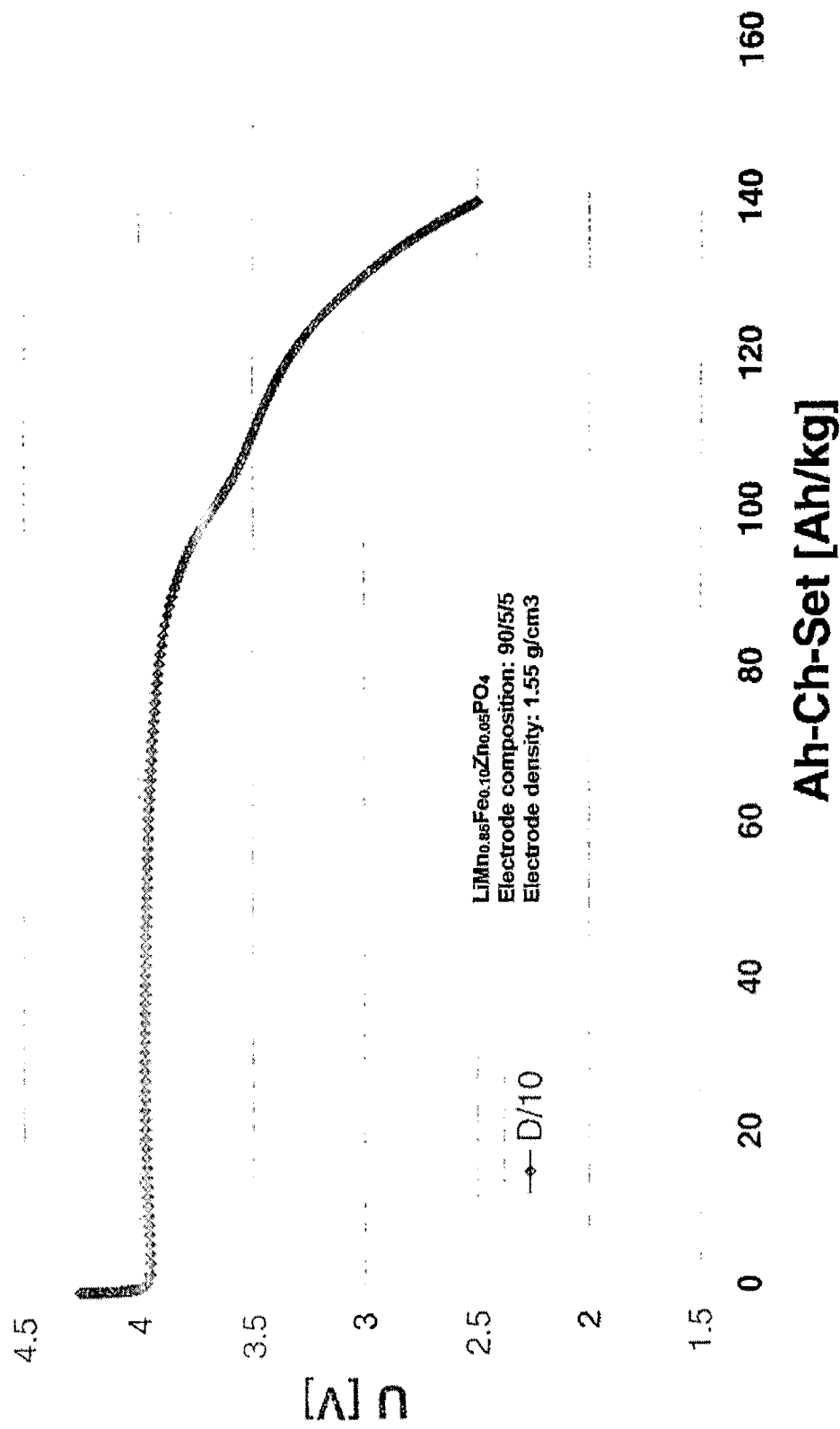
FIG. 14 the discharge curve at C/10 for $LiMn_{0.85}Fe_{0.10}Zn_{0.05}PO_4$ according to the invention.

FIGS. 13 and 14 show the discharge capacity at D/10 of the $LiMn_{0.80}Fe_{0.10}Zn_{0.10}PO_4$ and $LiMn_{0.85}Fe_{0.10}Zn_{0.05}PO_4$ materials according to the invention (produced according to Examples 2 and 4). It is shown that the 4V manganese plateau is even longer than in the case of $LiMn_{0.56}Fe_{0.33}Zn_{0.10}PO_4$ according to the invention.

In summary, the present invention makes available mixed lithium-manganese iron phosphate materials substituted with bivalent metal ions, which can be produced by means of a hydrothermal process. The specific discharge capacity for room temperature exceeds 140 mAh/g despite the substitution with sometimes 10% electrochemically inactive bivalent metal ions. Very good discharge rates were measured for all the substituted materials.

Compared with non-substituted $LiMn_{0.66}Fe_{0.33}PO_4$ it was shown that the discharge voltage profile at 1 D for the bivalently substituted novel materials according to the invention remains unchanged even after several charge and discharge cycles (the length of the Mn plateau at 4 volt remained unchanged).

It was found with respect to the energy density that the substitution with zinc or with magnesium gave the best results compared with copper, titanium and nickel.

The invention claimed is:

1. A lithium-manganese metal phosphate of formula

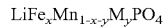

$$LiFe_xMn_{1-x-y}M_yPO_4$$

wherein M is a bivalent metal selected from the group consisting of Zn, Ca, and Cd, and wherein: x<1, 0<y<0.15 and x+y<1.

2. The lithium-manganese metal phosphate according to claim 1, wherein M is Zn or Ca.

3. The lithium-manganese metal phosphate according to claim 1, further comprising carbon.

4. The lithium-manganese metal phosphate according to claim 3, wherein the carbon is evenly distributed throughout the lithium-manganese metal phosphate.

5. The lithium-manganese metal phosphate according to claim 3, wherein the carbon covers the individual particles of the lithium manganese metal phosphate.

6. The lithium-manganese metal phosphate according to claim 3, wherein the proportion of carbon relative to the lithium manganese metal phosphate is <4 wt %.

7. Cathode for a secondary lithium-ion battery, comprising the lithium-manganese metal phosphate according to claim 1.

8. The cathode according to claim 7, further comprising a lithium-metal-oxygen compound.

9. The cathode according to claim 8, wherein the lithium-metal-oxygen compound is selected from the group consisting of $LiCoO_2$, $LiMn_2O_4$, $LiNiO_2$, $LiCoPO_4$, $LiFePO_4$, $LiMnPO_4$, $LiMnFePO_4$, and mixtures thereof.

10. The cathode according to claim 7, wherein the cathode is free of added conductive agents.

11. Process for producing the lithium-manganese metal phosphate according to claim 1, the process comprising the following steps:
   a) producing a mixture in aqueous solution containing at least a Li starting compound, a Mn starting compound, an Fe starting compound, a $M^{2+}$ starting compound and a $PO_4^{3-}$ starting compound, until a suspension forms,
   b) carrying out a dispersion or grinding treatment of the mixture and/or the suspension,
   c) obtaining a lithium-manganese metal phosphate of formula $LiFe_xMn_{1-x-y}M_yPO_4$ from the suspension by reaction of the suspension under hydrothermal conditions.

12. The process according to claim 11, further comprising, in step a) or step c), adding a carbon-containing component.

13. The process according to claim 12, further comprising mixing the lithium-manganese metal phosphate of formula $LiFe_xMn_{1-x-y}M_yPO_4$ obtained in step c) with a carbon-containing component.

14. The process according to claim 11, further comprising carrying out a drying step at a temperature of <100° C. and/or a calcining step at a temperature of >200° C.

15. The process according to claim 11, wherein the process is carried out under hydrothermal conditions at a temperature of 100° C. to 200° C. and at a pressure of 1 bar to 40 bar vapour pressure.

16. Lithium-manganese metal phosphate produced by the process according to claim 11.

* * * * *